US011475582B1

(12) United States Patent
Germer et al.

(10) Patent No.: US 11,475,582 B1
(45) Date of Patent: Oct. 18, 2022

(54) METHOD AND DEVICE FOR MEASURING PHYSICAL OBJECTS

(71) Applicant: Apple Inc., Cupertino, CA (US)

(72) Inventors: Austin Caleb Germer, Novato, CA (US); Vincent Paul Sparacino, San Bruno, CA (US); Adam James Bolton, Bend, OR (US); Tomas Alvarez Rodriguez, San Rafael, CA (US); Ryan Steven Bullock, Pleasanton, CA (US); Lori Lenore Smallwood, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/323,906

(22) Filed: May 18, 2021

Related U.S. Application Data

(60) Provisional application No. 63/040,605, filed on Jun. 18, 2020.

(51) Int. Cl.
*G06T 7/50* (2017.01)
*G06T 17/20* (2006.01)
*G01B 11/22* (2006.01)

(52) U.S. Cl.
CPC ............... *G06T 7/50* (2017.01); *G01B 11/22* (2013.01); *G06T 17/20* (2013.01); *G06T 2200/04* (2013.01); *G06T 2200/08* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 2013/0095924 A1 | 4/2013 | Geisner et al. | |
| 2015/0042678 A1* | 2/2015 | Alt | G06F 3/04815 |
| | | | 345/633 |
| 2016/0203640 A1* | 7/2016 | Breedvelt-Schouten | ................ |
| | | | G06V 40/107 |
| | | | 345/633 |
| 2017/0135519 A1* | 5/2017 | Deng | G07F 13/025 |
| 2018/0095542 A1* | 4/2018 | Mallinson | G06T 19/006 |
| 2018/0336732 A1 | 11/2018 | Schuster | |
| 2019/0197791 A1 | 6/2019 | Skidmore | |
| 2020/0311616 A1* | 10/2020 | Rajkumar | G06N 5/043 |
| 2020/0319010 A1* | 10/2020 | Cosneau | G06T 11/008 |
| 2020/0342668 A1* | 10/2020 | Chojnacka | G06K 9/6201 |
| 2021/0065426 A1* | 3/2021 | McGuire | G06T 7/00 |
| 2021/0090449 A1* | 3/2021 | Smith | G06N 5/02 |

* cited by examiner

*Primary Examiner* — Frank S Chen
(74) *Attorney, Agent, or Firm* — Fernando & Partners, LLP

(57) ABSTRACT

The method performed at an electronic device including one or more processors, a non-transitory memory, and a depth sensor includes: obtaining a task associated with a physical object within a physical environment; obtaining depth information, via the depth sensor, associated with the physical environment; determining one or more measurements for the physical object based at least in part on the depth information; obtaining a graphical overlay based at least in part on the task and the one or more measurements for the physical object; and causing presentation of the graphical overlay adjacent to a representation of the physical object, wherein the representation is obtained using sensor readings of the physical object.

22 Claims, 21 Drawing Sheets

METHOD AND DEVICE FOR MEASURING PHYSICAL OBJECTS

TECHNICAL FIELD

The present disclosure generally relates to measuring physical objects, and in particular, to systems, methods, and devices for measuring physical objects to accomplish an associated task.

BACKGROUND

In some instances, eyeballing volume and mass measurements for cooking or home improvement projects can be futile at best. Furthermore, estimating volume and mass measurements with a single camera is likewise a difficult task.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
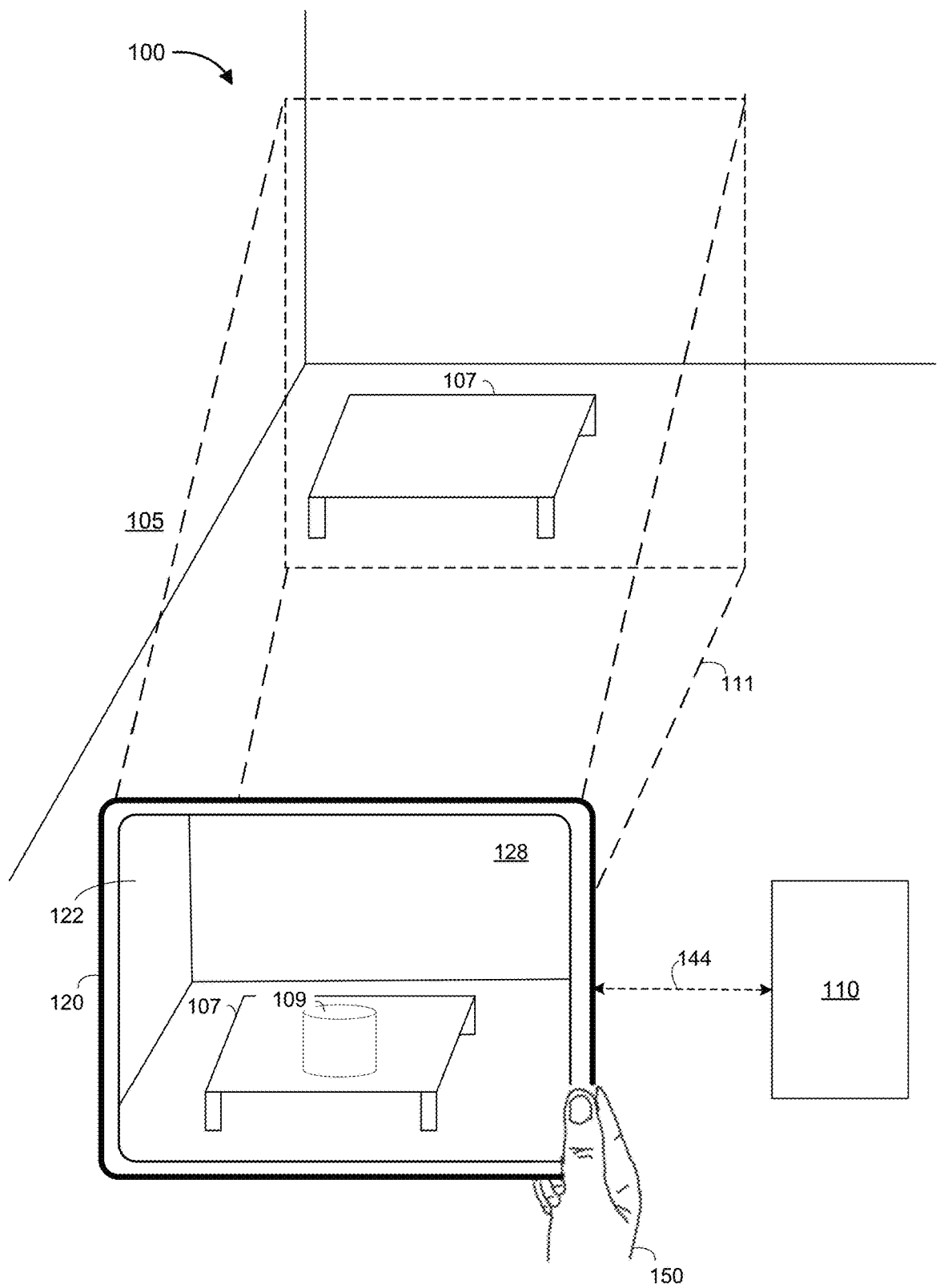
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for measuring physical objects to accomplish an associated task. According to some implementations, the method is performed at an electronic device including one or more processors, non-transitory memory, and a depth sensor. The method includes: obtaining a task associated with a physical object within a physical environment; obtaining depth information, via the depth sensor, associated with the physical environment; determining one or more measurements for the physical object based at least in part on the depth information; obtaining a graphical overlay based at least in part on the task and the one or more measurements for the physical object; and causing presentation of the graphical overlay adjacent to a representation of the physical object, wherein the representation is obtained using sensor readings of the physical object.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, ahead mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, near-eye system, wearable computing device, or the like).

In some implementations, the controller 110 is configured to manage and coordinate an XR experience (sometimes also referred to herein as a "XR environment" or a "virtual environment" or a "graphical environment") for a user 150 and optionally other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video (A/V) content to the user 150. In some implementations, the electronic device 120 is configured to present a user interface (UI) and/or an XR environment 128 to the user 150. In some implementations, the electronic device 120 includes a suitable combination of software, firmware, and/or hardware. The electronic device 120 is described in greater detail below with respect to FIG. 3.

According to some implementations, the electronic device 120 presents an XR experience to the user 150 while the user 150 is physically present within a physical environment 105 that includes a table 107 within the field-of-view (FOV) 111 of the electronic device 120. As such, in some implementations, the user 150 holds the electronic device 120 in his/her hand(s). In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 107 or a representation thereof) on a display 122. For example, the XR environment 128, including the XR cylinder 109, is volumetric or three-dimensional (3D).

In one example, the XR cylinder 109 corresponds to head/display-locked content such that the XR cylinder 109 remains displayed at the same location on the display 122 as the FOV 111 changes due to translational and/or rotational movement of the electronic device 120. As another example, the XR cylinder 109 corresponds to world/object-locked content such that the XR cylinder 109 remains displayed at its origin location as the FOV 111 changes due to translational and/or rotational movement of the electronic device 120. As such, in this example, if the FOV 111 does not include the origin location, the XR environment 128 will not include the XR cylinder 109. For example, the electronic device 120 corresponds to a near-eye system, mobile phone, tablet, laptop, wearable computing device, or the like.

In some implementations, the display 122 corresponds to an additive display that enables optical see-through of the physical environment 105 including the table 107. For example, the display 122 corresponds to a transparent lens, and the electronic device 120 corresponds to a pair of glasses worn by the user 150. As such, in some implementations, the electronic device 120 presents a user interface by projecting the XR content (e.g., the XR cylinder 109) onto the additive display, which is, in turn, overlaid on the physical environment 105 from the perspective of the user 150. In some implementations, the electronic device 120 presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the FOV of the user 150. In such implementations, the electronic device 120 presents the XR environment 128 by displaying data corresponding to the XR environment 128 on the one or more displays or by projecting data corresponding to the XR environment 128 onto the retinas of the user 150.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment 128 based on movement information (e.g., body pose data, eye tracking data, hand/limb/finger/extremity tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
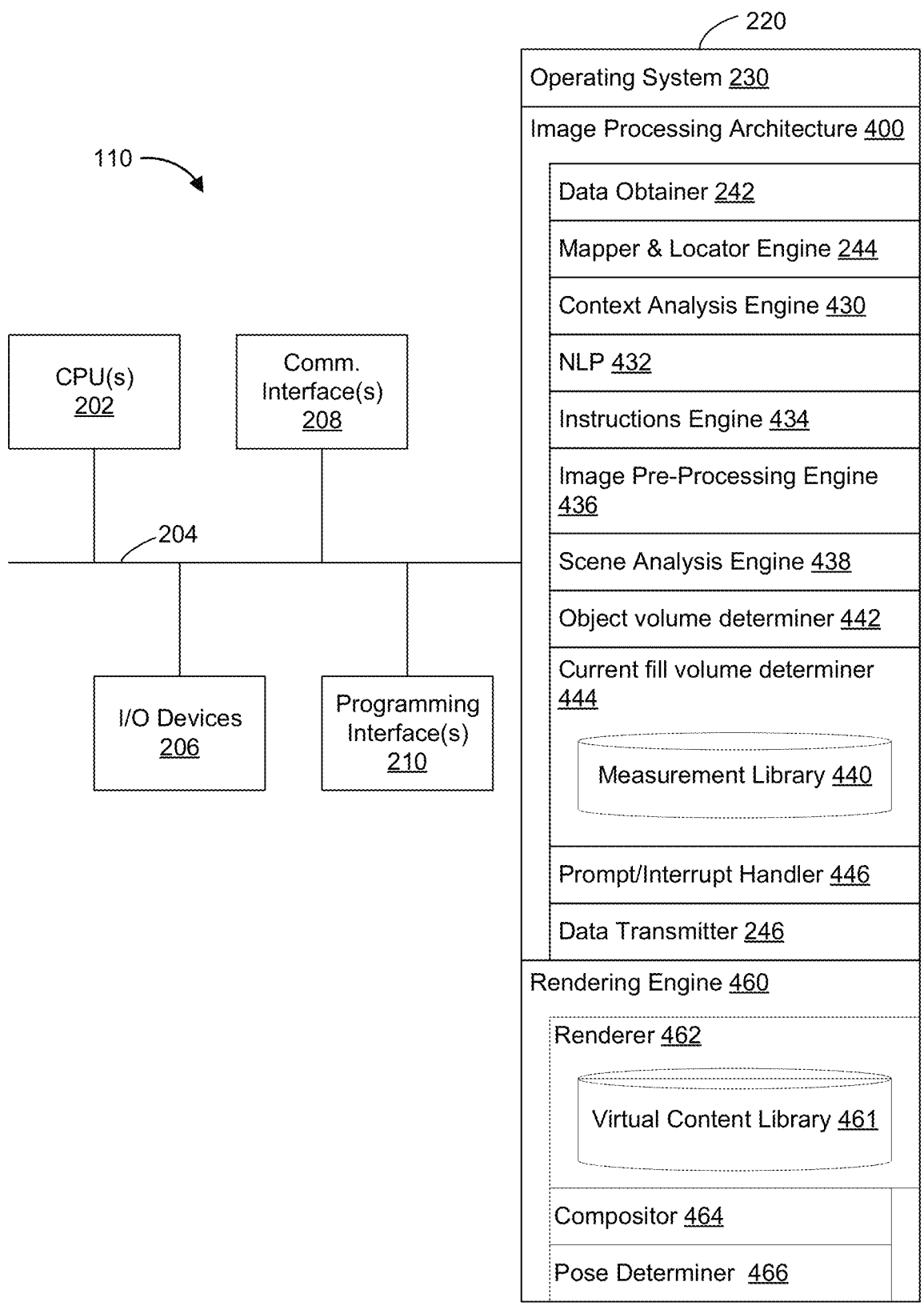
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a touch-screen, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230, a data processing architecture 400, and a rendering engine 460.

The operating system 230 includes procedures for handling various basic system services and for performing hardware dependent tasks.

In some implementations, the data processing architecture 400 is configured to process user information and images of a physical environment in order to measure physical objects within the physical environment to accomplish an associated task. To that end, in some implementations, the data processing architecture 400 includes a data obtainer 242, a mapper and locator engine 244, a context analysis engine 430, a natural language processor (NLP) 432, an instructions engine 434, an image pre-processing engine 436, a scene analysis engine 438, an object volume determiner 442, a current fill volume determiner 444, a prompt/interrupt handler 446, and a data transmitter 246.

In some implementations, the data obtainer 242 is configured to obtain data (e.g., captured image frames of the physical environment 105, presentation data, input data, user interaction data, camera pose tracking information, eye tracking information, head/body pose tracking information, hand/limb tracking information, sensor data, location data, etc.) from at least one of the I/O devices 206 of the controller 110, the electronic device 120, and the optional remote input devices. To that end, in various implementations, the data obtainer 242 includes instructions and/or logic therefor, and heuristics and metadata therefor.

In some implementations, the mapper and locator engine 244 is configured to map the physical environment 105 and to track the position/location of at least the electronic device 120 with respect to the physical environment 105. To that end, in various implementations, the mapper and locator engine 244 includes instructions and/or logic therefor, and heuristics and metadata therefor.

In some implementations, the context analysis engine 430 is configured to obtain (e.g., receive, retrieve, or determine/generate) a contextual information vector based on position/rotation/movement information, a gaze direction, body/head/hand/limb pose information, user input information, and/or the like based on data collected from the localization and mapping engine 244, an eye tracking engine, a body/head pose tracking engine, a hand/limb tracking engine, a camera pose tracking engine, and/or the like. To that end, in various implementations, the context analysis engine 430 includes instructions and/or logic therefor, and heuristics and metadata therefor.

In some implementations, the NLP 432 is configured to parse speech data from the user 150 and optionally convert the speech data to text. To that end, in various implementations, the NLP 432 includes instructions and/or logic therefor, and heuristics and metadata therefor.

In some implementations, the instructions engine 434 is configured to obtain (e.g., receive, retrieve, or determine/generate) an instruction or a set of instructions that the user 150 intends to carry out (e.g., filling a cup with X fluid ounces of water, or measuring ingredients in order to follow a cookie recipe). In some implementations, the instruction or set of instructions corresponds to one or more tasks such as measuring out X fluid ounces of water, baking a cake and measuring out ingredients. In some implementations, the instruction or set of instructions is determined based on the speech data from the user 150. In some implementations, the instruction or set of instructions is determined by parsing a set of text instructions provided by the user 150 (e.g., manually typing out a recipe or procuring a recipe from a local or remote electronic source). In some implementations, the instruction or set of instructions is determined by performing text/character recognition on a physical set of instructions provided by the user (e.g., a physical recipe recipe) and/or the like. To that end, in various implementations, the instructions engine 434 includes instructions and/or logic therefor, and heuristics and metadata therefor.

In some implementations, the image pre-processing engine 436 is configured to obtain (e.g., receive, retrieve, or capture) an image stream of an environment in order to generate a processed image stream. In some implementations, the image stream corresponds to a sequence of sporadic images, a live video feed, and/or the like. In some implementations, the environment corresponds to a physical environment, a partially XR environment, a fully XR environment, or the like. In some implementations, the image pre-processing engine 436 is also configured to perform one or more pre-processing operations on the image stream such as warping, noise reduction, white balance, color correction, gamma correction, sharpening, and/or the like. To that end, in various implementations, the image pre-processing engine 436 includes instructions and/or logic therefor, and heuristics and metadata therefor.

In some implementations, the scene analysis engine 438 is configured to perform one or more scene analysis operations on the processed image stream of the environment in order to generate semantic scene information such as labels for objects within the environment or the like. In some implementations, the one or more scene analysis operations includes text/character recognition, object recognition, instance segmentation, semantic segmentation, dimensional analysis, and/or the like. To that end, in various implementations, the scene analysis engine 438 includes instructions and/or logic therefor, and heuristics and metadata therefor.

In some implementations, the object volume determiner 442 is configured to determine one or more estimated dimensions (or measurements) for an object in the environment based on the processed image stream, the semantic scene information, and depth information. In some implementations, the one or more estimated dimensions (or measurements) correspond to an estimated available volume of the object when the object corresponds to a vessel (e.g., a fillable bowl, cup, mug, dish, etc.), an estimated (unfilled) volume of the object (e.g., the volume of a closed spherical object), an estimated surface area of the object, dimensions of the object (e.g., length, width, and depth), an estimated mass of the object, and/or the like. In some implementations, the object corresponds to a physical object, a partially XR object, a fully XR object, or the like. To that end, in various implementations, the available volume determiner 444 includes instructions and/or logic therefor, and heuristics and metadata therefor.

In some implementations, the optional current fill volume determiner 444 is configured to determine an estimated current fill volume of the object when the object corresponds to a vessel (e.g., a fillable bowl, cup, mug, dish, or the like with a substance therein such as a liquid or solid) based on the processed image stream, the semantic scene information, the depth information, the one or more estimated dimensions of the object, and a measurement library 440. In some implementations, the current fill volume determiner 444 may also consider environmental information, such as a current temperature, humidity, barometric pressure, elevation, G-force, or the like, for a more accurate mass measurement. In some implementations, the measurement library 440 includes a plurality of average or typical mass-per-volume values for various liquids, solids, semi-solids, and/or the like such as water, oil, flour, sugar, seeds, chocolate chips, and/or the like (e.g., 1 mL of water weighs 1 g). To that end, in various implementations, the current fill volume determiner 444 includes instructions and/or logic therefor, and heuristics and metadata therefor. One of ordinary skill in the art will appreciate that the optional current fill volume determiner 444 may be implemented or utilized when the object corresponds to a fillable vessel but may not be implemented or utilized when the object corresponds to a solid/unfillable object.

In some implementations, the prompt/interrupt handler 446 is configured to obtain (e.g., receive, retrieve, or determine/generate) audio/visual feedback based on the one or more estimated dimensions of the object and the estimated current fill volume of the object in order to complete/satisfy the set of instructions. To that end, in various implementations, the prompt/interrupt handler 446 includes instructions and/or logic therefor, and heuristics and metadata therefor.

In some implementations, the data transmitter 246 is configured to transmit data (e.g., presentation data such as rendered image frames associated with the XR environment, location data, etc.) to at least the electronic device 120. To that end, in various implementations, the data transmitter 246 includes instructions and/or logic therefor, and heuristics and metadata therefor.

Although the data obtainer 242, the mapper and locator engine 244, the context analysis engine 430, the NLP 432, the instructions engine 434, the image pre-processing engine 436, the scene analysis engine 438, the object volume determiner 442, the current fill volume determiner 444, prompt/interrupt handler 446, and the data transmitter 246 are shown as residing on a single device (e.g., the controller 110), it should be understood that in other implementations, any combination of the data obtainer 242, the mapper and locator engine 244, the context analysis engine 430, the NLP 432, the instructions engine 434, the image pre-processing engine 436, the scene analysis engine 438, the object volume determiner 442, the current fill volume determiner 444, the prompt/interrupt handler 446, and the data transmitter 246 may be located in separate computing devices.

In some implementations, the rendering engine 460 is configured to render, present, and modify a virtual/XR environment. To that end, in various implementations, the rendering engine 460 includes instructions and/or logic therefor, and heuristics and metadata therefor. In some implementations, the rendering engine 460 includes a renderer 462, a compositor 464, and a pose determiner 466.

In some implementations, the renderer 462 is configured to render virtual/XR content from the virtual content library 461 according to a current camera pose relative thereto. To that end, in various implementations, the renderer 462 includes instructions and/or logic therefor, and heuristics and metadata therefor.

In some implementations, the virtual content library 461 includes a plurality of virtual/XR objects, items, scenery, and/or the like. In some implementations, the virtual content library 461 is stored locally and/or remotely. In some implementations, the virtual content library 461 is pre-populated or manually authored by the user 150.

In some implementations, the compositor 464 is configured to composite the rendered virtual/XR content with image(s) of the physical environment. In some implementations, the compositor 464 obtains (e.g., receives, retrieves, determines/generates, or otherwise accesses) depth information (e.g., a point cloud, mesh, or the like) associated with the scene (e.g., the physical environment 105 in FIG. 1) to maintain z-order between the rendered virtual/XR content and physical objects in the physical environment. To that end, in various implementations, the compositor 464 includes instructions and/or logic therefor, and heuristics and metadata therefor.

In some implementations, the pose determiner 466 is configured to determine a current camera pose of the electronic device 120 and/or the user 150 relative to the virtual/XR content. To that end, in various implementations, the pose determiner 466 includes instructions and/or logic therefor, and heuristics and metadata therefor.

Although the renderer 462, the compositor 464, and the pose determiner 466 are shown as residing on a single device (e.g., the controller 110), it should be understood that in other implementations, any combination of the renderer 462, the compositor 464, and the pose determiner 466 may be located in separate computing devices.

In some implementations, the functions and/or components of the controller 110 are combined with or provided by the electronic device 120 shown below in FIG. 3. Moreover, FIG. 2 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
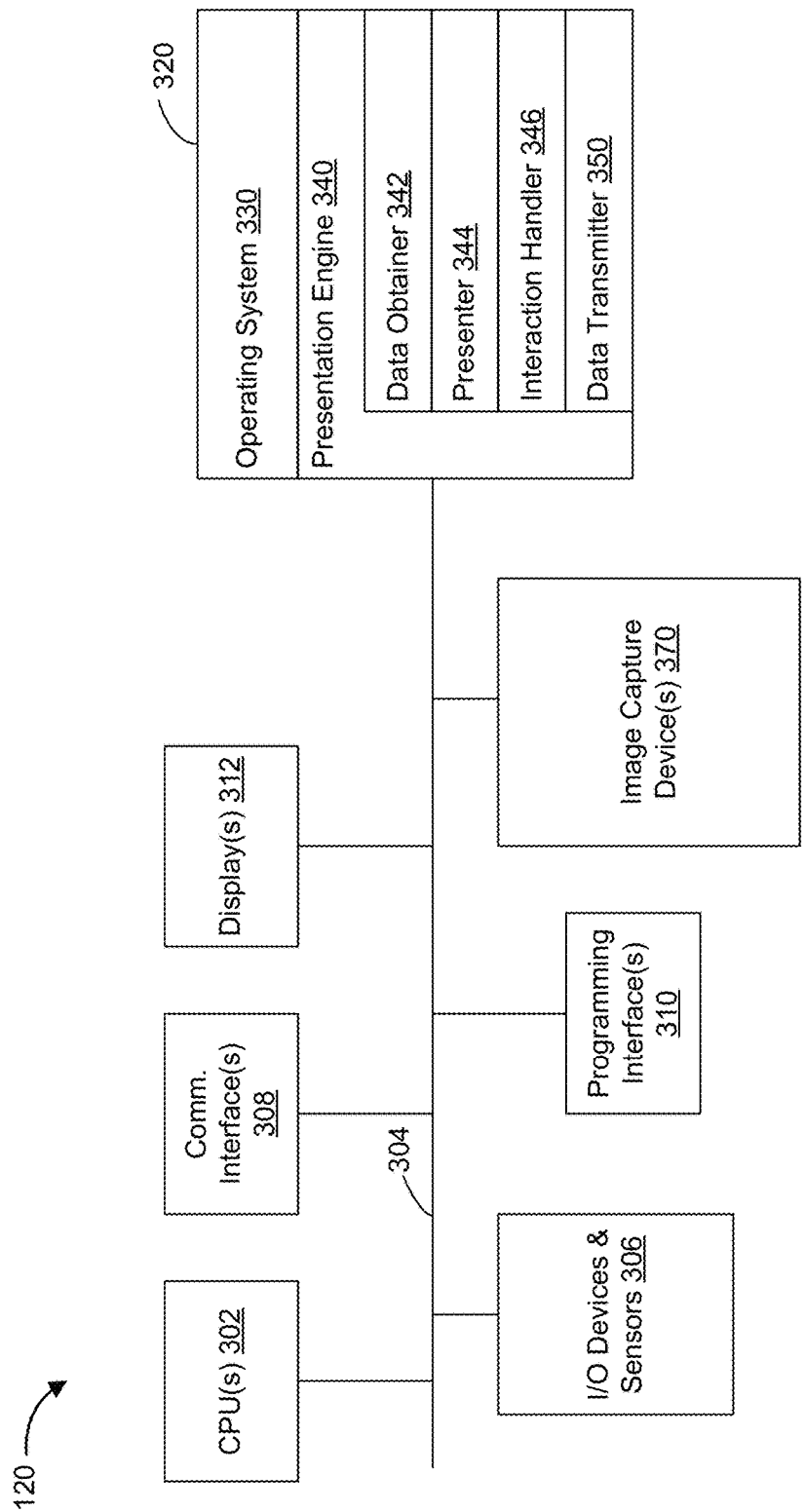
FIG. 3 is a block diagram of an example electronic device in accordance with some implementations.

FIG. 3 is a block diagram of an example of the electronic device 120 (e.g., a mobile phone, tablet, laptop, near-eye system, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, an image capture device 370 (e.g., one or more optional interior- and/or exterior-facing image sensors), a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, one or more depth sensors (e.g., structured light, time-of-flight, LiDAR, or the like), a localization and mapping engine, an eye tracking engine, a body/head pose tracking engine, a hand/limb tracking engine, a camera pose tracking engine, and/or the like.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the image capture device 370 correspond to one or more RGB cameras (e.g., with a complementary metal-oxide-semiconductor (CMOS) image sensor or a charge-coupled device (CCD) image sensor), IR image sensors, event-based cameras, and/or the like. In some implementations, the image capture device 370 includes a lens assembly, a photodiode, and a front-end architecture.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation engine 340.

The operating system 330 includes procedures for handling various basic system services and for performing hardware dependent tasks. In some implementations, the XR presentation engine 340 is configured to present XR content to the user via the one or more displays 312. To that end, in various implementations, the XR presentation engine 340 includes a data obtainer 342, a presenter 344, an interaction handler 346, and a data transmitter 350.

In some implementations, the data obtainer 342 is configured to obtain data (e.g., presentation data such as rendered image frames associated with the XR environment, input data, user interaction data, head tracking information, camera pose tracking information, eye tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the presenter 344 is configured to present and update XR content (e.g., the rendered image frames associated with the XR environment) via the one or more displays 312. To that end, in various implementations, the presenter 344 includes instructions and/or logic therefor, and heuristics and metadata therefor.

In some implementations, the interaction handler 346 is configured to detect user interactions with the presented XR content. To that end, in various implementations, the interaction handler 346 includes instructions and/or logic therefor, and heuristics and metadata therefor.

In some implementations, the data transmitter 350 is configured to transmit data (e.g., presentation data, location data, user interaction data, head tracking information, camera pose tracking information, eye tracking information, etc.) to at least the controller 110. To that end, in various implementations, the data transmitter 350 includes instructions and/or logic therefor, and heuristics and metadata therefor.

Although the data obtainer 342, the presenter 344, the interaction handler 346, and the data transmitter 350 are shown as residing on a single device (e.g., the electronic device 120), it should be understood that in other implementations, any combination of the data obtainer 342, the presenter 344, the interaction handler 346, and the data transmitter 350 may be located in separate computing devices.

Moreover, FIG. 3 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
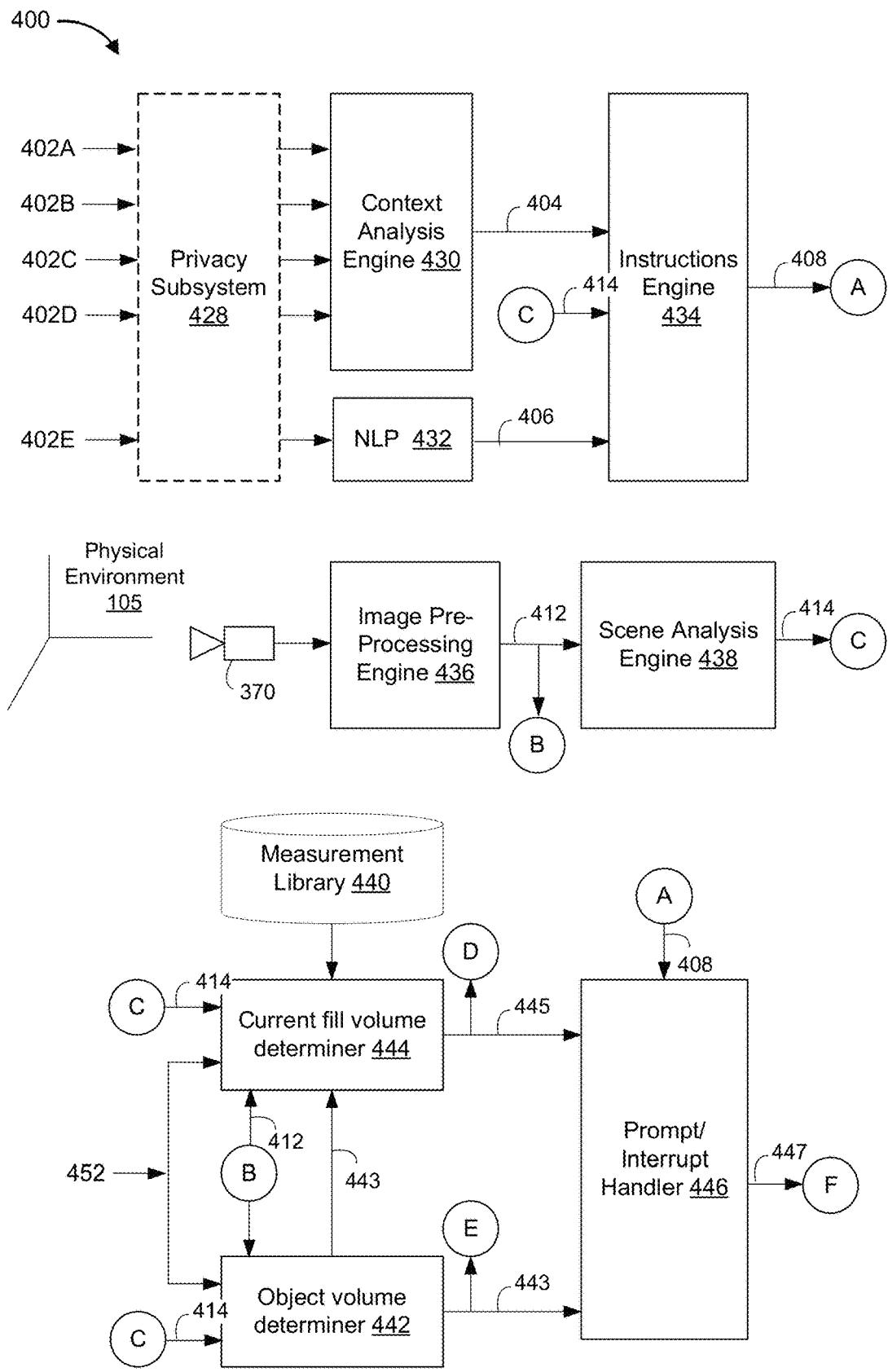
FIGS. 4A and 4B show a block diagram of an example image processing architecture in accordance with some implementations.
Figure 4B:
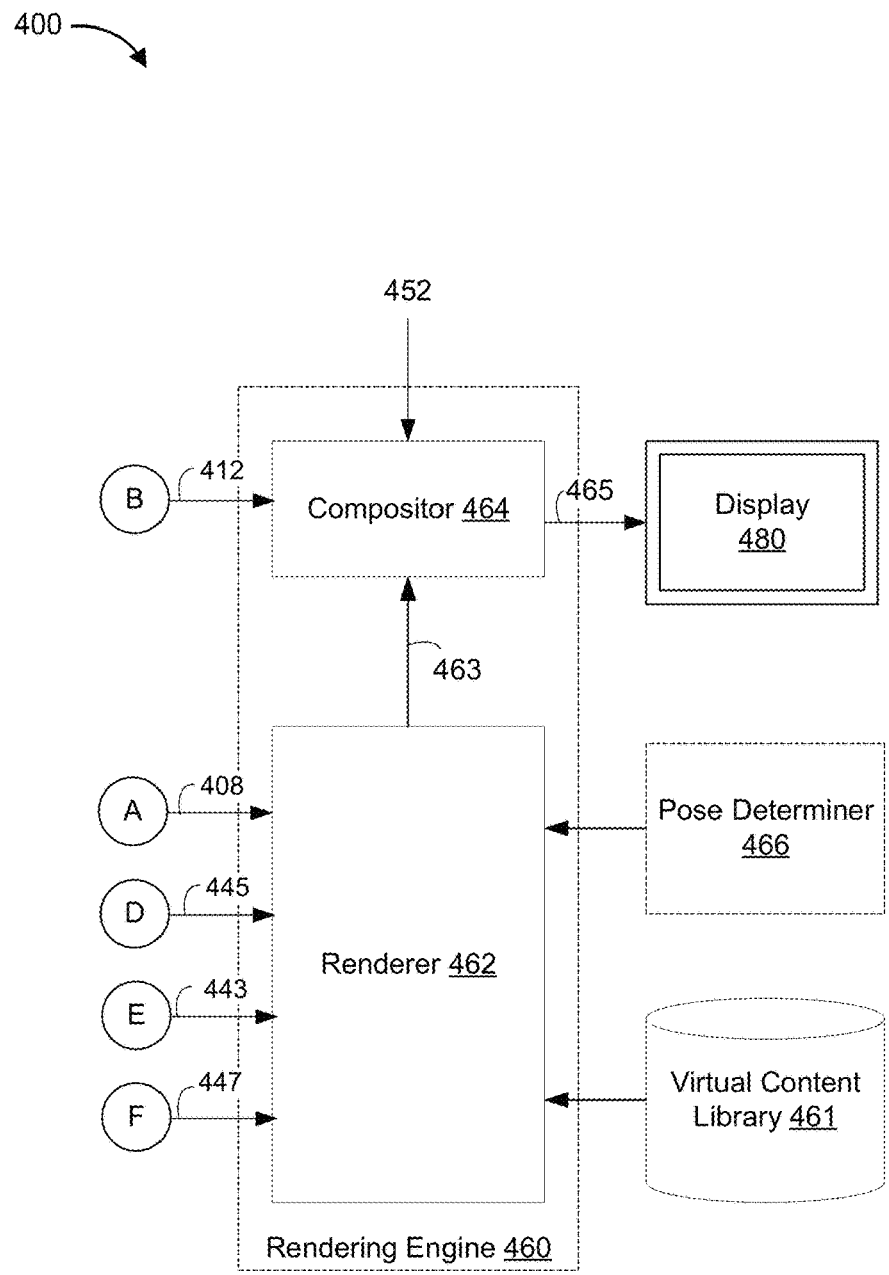

FIGS. 4A and 4B show a block diagram of an example data processing architecture 400 in accordance with some implementations. While certain specific features are illustrated, those skilled in the art will appreciate from the present disclosure that various other features have not been illustrated for the sake of brevity, and so as not to obscure more pertinent aspects of the implementations disclosed herein.

As shown in FIG. 4A, in some implementations, the image capture device 370 captures one or more images of the physical environment 105 (or, alternatively, a partially or fully XR environment). In some implementations, the image pre-processing engine 436 performs one or more pre-processing operations on the images from the image capture device 370, such as warping, noise reduction, white balance, color correction, gamma correction, sharpening, and/or the like, in order to provide a processed image stream 412 of the physical environment 105. In some implementations, the scene analysis engine 438 performs one or more scene analysis operations on the processed image stream 412 of the physical environment 105 in order to generate semantic scene information 414 such as labels for objects within the physical environment 105 or the like.

As shown in FIG. 4A, the context analysis engine 430 obtains (e.g., receives, retrieves, or determines/generates) a contextual information vector 404 based on user information, including position/rotation/movement information 402A, a gaze direction 402B, body/head/hand/limb pose information 402C, user input information 402D, and/or the like based on data collected from a localization and mapping engine, an eye tracking engine, a body/head pose tracking engine, a hand/limb tracking engine, a camera pose tracking engine, and/or the like. In some implementations, the NLP 432 obtains (e.g., receives or retrieves) speech data 402E from the user 150. In some implementations, the NLP 432 parses the speech data 402E from the user 150 and, optionally, converts the speech data 402E to a text representation 406 thereof. In some implementations, the user information, which includes the position/rotation/movement information 402A, the gaze direction 402B, the body/head/hand/limb pose information 402C, the user input information 402D, and the speech data 402E, may be subject to an optional privacy subsystem 428 prior to ingestion of the user information by the context analysis engine 430 and the NLP 432.

To this end, in various implementations, the data processing architecture 400 includes the optional privacy subsystem 428 with one or more privacy filters associated with user information and/or identifying information (e.g., at least some portions of the position/rotation/movement information 402A, the gaze direction 402B, the body/head/hand/limb pose information 402C, the user input information 402D, and the speech data 402E). In some implementations, the privacy subsystem 428 selectively prevents and/or limits the data processing architecture 400 or portions thereof from obtaining and/or transmitting the user information. To this end, the privacy subsystem 428 receives user preferences and/or selections from the user in response to prompting the user for the same. In some implementations, the privacy subsystem 428 prevents the data processing architecture 400 from obtaining and/or transmitting the user information unless and until the privacy subsystem 428 obtains informed consent from the user. In some implementations, the privacy subsystem 428 anonymizes (e.g., scrambles or obscures) certain types of user information. For example, the privacy subsystem 428 receives user inputs designating which types of user information the privacy subsystem 428 anonymizes. As another example, the privacy subsystem 428 anonymizes certain types of user information likely to include sensitive and/or identifying information, independent of user designation (e.g., automatically).

As shown in FIG. 4A, the instructions engine 434 obtains (e.g., receives, retrieves, or determines/infers/generates) an instruction or a set of instructions 408 that the user 150 intends to carry out (e.g., filling a cup with X fluid ounces of water, or measuring ingredients in order to follow a cookie recipe) based at least in part on the contextual information vector 404 and the text representations 406 of the speech data 402E. As one example, the instructions engine 434 determines the set of instructions 408 based on the text representation 406 of the speech data 402E from the user 150. As another example, the instructions engine 434 determines the set of instructions 408 by parsing a set of text instructions provided by the user 150 (e.g., a manually typed out a recipe, or a text recipe procured from a local or remote electronic source). As yet another example, the instructions engine 434 determines the set of instructions 408 by performing text/character recognition on a physical set of instructions provided by the user (e.g., a physical recipe card). One of ordinary skill in the art will appreciate that the instructions engine 434 may determine the set of instructions 408 in myriad ways and from myriad input modalities. FIGS. 5A-5E illustrate a sequence of example instances of a first measurement scenario according to a first set of instructions (e.g., a verbal user request to fill a cup with X fluid ounces of water) in accordance with some implementations. Similarly, FIGS. 6A-6J illustrate a sequence of example instances of a second measurement scenario according to a second set of instructions (e.g., a physical index card with a chocolate chip cookie recipe thereon) in accordance with some implementations.

As shown in FIG. 4A, the object volume determiner 442 determines one or more estimated dimensions (or measurements) 443 of a physical object within the physical environment 105 based on the processed image stream 412, the semantic scene information 414, and depth information 452. In some implementations, the depth information 452 corresponds to a (depth) mesh, point cloud, or the like of the physical environment 105. In some implementations, the depth information 452 corresponds to a (depth) mesh, point cloud, or the like of a portion of the physical environment 105 such as one or more physical objects that the user intends on interacting with. For example, the data processing architecture 400 determines user intent based on the contextual information vector 404 (e.g., the gaze direction 202B). In some implementations, the depth information 452 is collected by a depth sensor using techniques known in the art such as structured light, time-of-flight, LiDAR, or the like.

As shown in FIG. 4A, the one or more estimated dimensions (or measurements) 443 of the physical object corresponds to an estimated available volume of the physical object when the physical object corresponds to a vessel (e.g., a fillable bowl, cup, mug, dish, etc.), an estimated (unfilled) volume of the physical object (e.g., the volume of a closed spherical object, or another solid non-concave object), an estimated surface area of the physical object, dimensions of the physical object (e.g., length, width, and depth), an estimated mass of the physical object, and/or the like.

As shown in FIG. 4A, the current fill volume determiner 444 determines an estimated current fill volume 445 of the physical object when the physical object corresponds to a vessel (e.g., a fillable bowl, cup, mug, dish, or the like with a substance therein such as a liquid or solid) based on the processed image stream 412, the semantic scene information 414, the depth information 452, the one or more estimated dimensions 443 of the physical object, and a measurement library 440. In some implementations, the current fill volume determiner 444 may also consider environmental information, such as a current temperature, humidity, barometric pressure, elevation, G-force, or the like, for more accurate measurements (e.g., mass measurement). In some implementations, the measurement library 440 includes a plurality of average or typical mass-per-volume values for various liquids, solids, semi-solids, and/or the like such as water, oil, flour, sugar, seeds, chocolate chips, and/or the like (e.g., 1 mL of water weighs 1 g).

As shown in FIG. 4A, the prompt/interrupt handler 446 obtains (e.g., receives, retrieves, or determines/generates) audio/visual feedback 447 based on the one or more estimated dimensions 443 of a physical object and the estimated current fill volume 445 of the physical object in order to complete/satisfy the set of instructions 408. FIGS. 5A-5E illustrate a sequence of example instances of a first measurement scenario accompanied by first feedback (e.g., an XR overlay 522 indicating a fill line for water in FIG. 5C) in accordance with some implementations. Similarly, FIGS. 6A-6J illustrate a sequence of example instances of a second measurement scenario accompanied by second feedback (e.g., an XR overlay 644 for measuring out a correct amount of chocolate chips in FIG. 6E) in accordance with some implementations. One of ordinary skill in the will appreciate that the term "XR overlay" may also be replaced with "graphical overlay" in various implementations.

As one example, the prompt/interrupt handler 446 provides audible feedback when the estimated current fill volume 445 of the physical object satisfies or does not satisfy the one or more instructions 408 (e.g., "the mixing bowl now contains 15 g of sugar according to the recipe", or "the mixing bowl is still 5 g short of the amount of sugar indicated by the recipe"). As another example, the prompt/ interrupt handler 446 provides an XR overlay indicating a fill line in order to fill a vessel with X fluid ounces of water. As yet another example, the prompt/interrupt handler 446 provides an XR overlay indicating a cutting/apportionment line in order to measure out 1 cup of butter relative to a stick of butter.

As shown in FIG. 4B, the renderer 462 renders virtual/XR content 463 from the virtual content library 461 relative to a current camera pose from the pose determiner 466. In some implementations, the virtual/XR content 463 may include one or more XR overlays indicating the one or more estimated dimensions 443 of the physical object, the estimated current fill volume 445 of the physical object, the set of instructions 408, and/or the audio/visual feedback 447.

As shown in FIG. 4B, the compositor 464 composites the rendered virtual/XR content 463 with the processed image stream 412 based at least in part on the depth information 452 (e.g., to maintain z-order) to generate a rendered frame 465 of the XR environment. In turn, the display 480 displays the rendered frame 465 of the XR environment to the user 150. In some implementations, the compositor 464 obtains (e.g., receives, retrieves, determines/generates, or otherwise accesses) the depth information 452 (e.g., a point cloud, mesh, or the like) associated with the scene (e.g., the physical environment 105 in FIG. 1, or a portion thereof) to maintain z-order between the rendered virtual/XR content and physical objects in the physical environment.

FIGS. 5A-5E illustrate a sequence of instances 500, 510, 520, 530, and 540 of a first measurement scenario in accordance with some implementations. While certain specific features are illustrated, those skilled in the art will appreciate from the present disclosure that various other features have not been illustrated for the sake of brevity, and so as not to obscure more pertinent aspects of the implementations disclosed herein.

As shown in FIGS. 5A-5E, the first measurement scenario includes a physical environment 505 and an XR environment 128 displayed on the display 122 of the electronic device 120. The electronic device 120 presents the XR environment 128 to the user 150 while the user 150 is physically present within the physical environment 505 (e.g., a home kitchen) that includes a pitcher 502 on a countertop 504 within the FOV 111 of an exterior-facing image sensor of the electronic device 120. As such, in some implementations, the user 150 holds the electronic device 120 in his/her hand(s) similar to the operating environment 100 in FIG. 1.

In other words, in some implementations, the electronic device 120 is configured to present XR content and to enable optical see-through or video pass-through of at least a portion of the physical environment 505 on the display 122. For example, the electronic device 120 corresponds to a mobile phone, tablet, laptop, near-eye system, wearable computing device, or the like.

Figure 5A:
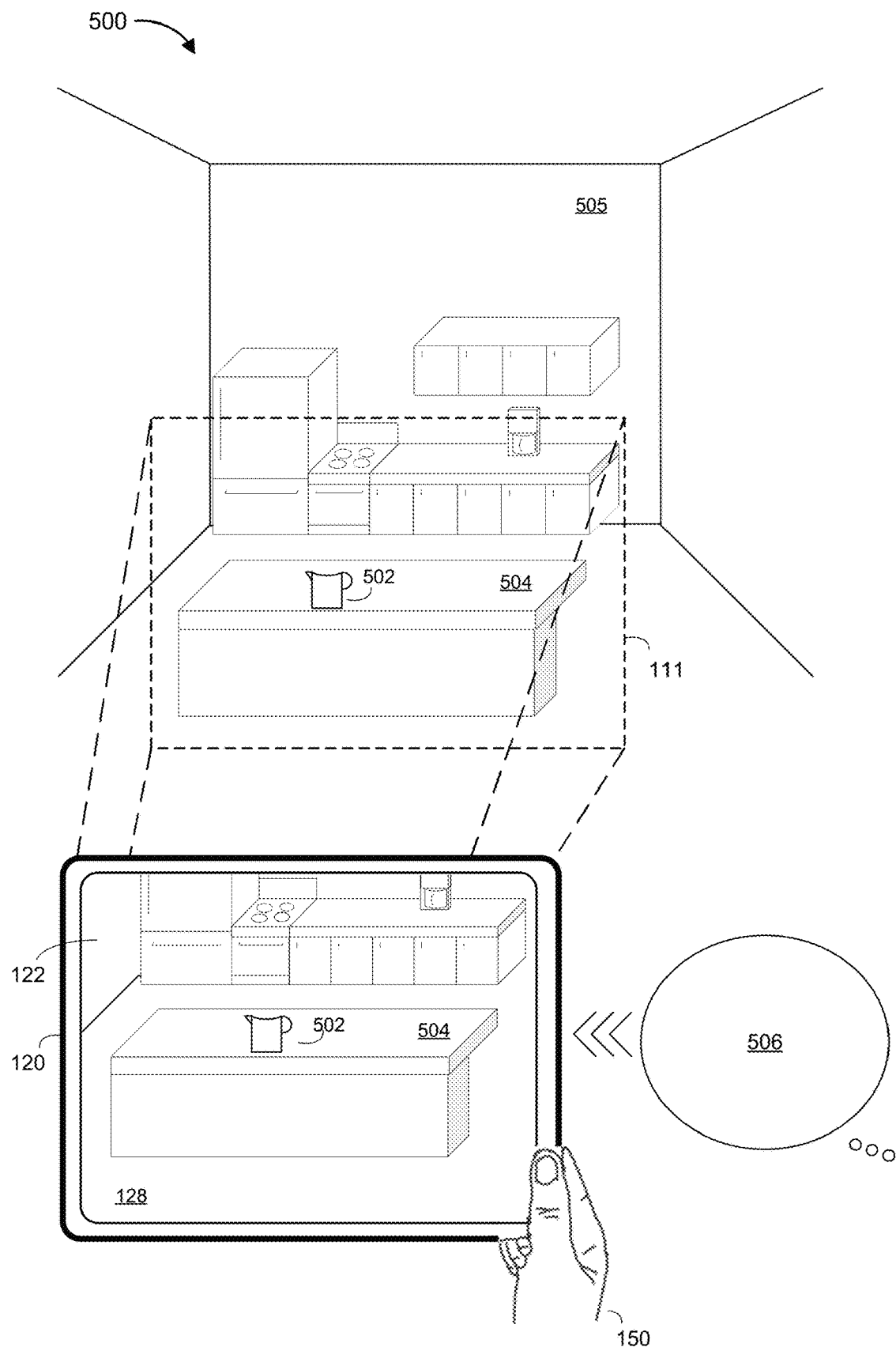
FIGS. 5A-5E illustrate a sequence of instances of a first measurement scenario in accordance with some implementations.
Figure 5B:
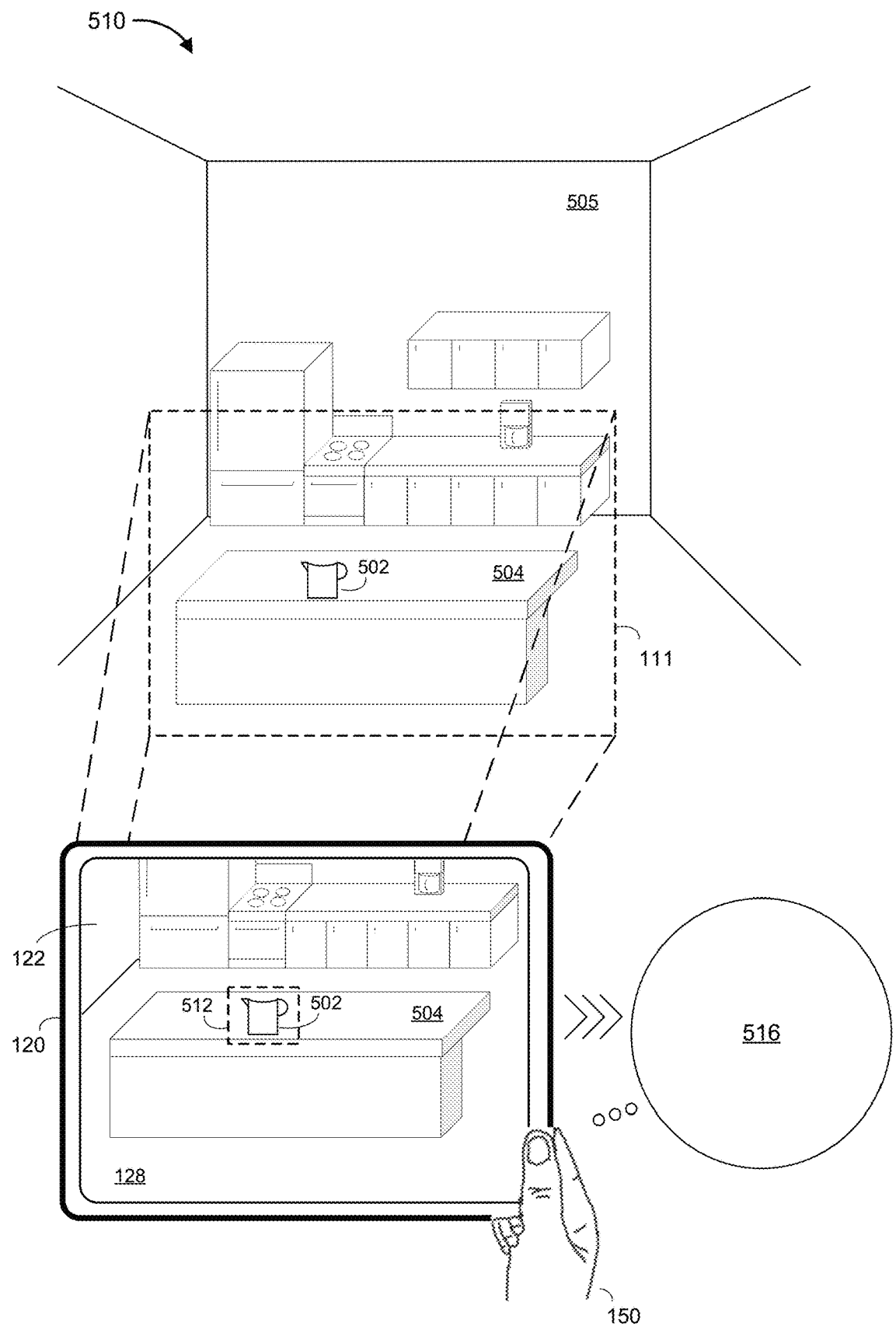

As shown in FIG. 5A, during the instance 500 (e.g., associated with time $T_1$) of the first measurement scenario, the electronic device 120, the controller 110, or a suitable combination thereof detects a user speech input 506 (e.g., "I would like to measure out 16 fluid ounces in the pitcher.") via one or more microphones. In FIGS. 5A and 5B, the FOV 111 of an exterior-facing image sensor of the electronic device 120 corresponds to a perspective view of the pitcher 502 on the countertop 504. For example, the electronic device 120, the controller 110, a suitable combination of the electronic device 120 and the controller 110, or a component thereof (e.g., the NLP 432 in FIG. 4A) processes the user speech input 506 by converting the user speech input 506 to text. Continuing with this example, the electronic device 120, the controller 110, a suitable combination of the electronic device 120 and the controller 110, or a component thereof (e.g., the instructions engine 434 in FIG. 4A) determines an instruction (or a set of instructions) based on the text version of the user speech input 506 (e.g., measure 16 fluid ounces in the pitcher).

As shown in FIG. 5B, during the instance 510 (e.g., associated with time $T_2$) of the first measurement scenario, the electronic device 120, the controller 110, or a suitable combination thereof outputs audible feedback 516 (e.g., "Cannot estimate vessel's volume from the current view. Please get close and view the vessel from additional angles.") in response to detecting the user speech input 506 in FIG. 5A. For example, the electronic device 120, the controller 110, a suitable combination of the electronic device 120 and the controller 110, or a component thereof (e.g., the object volume determiner 442 in FIG. 4A) is unable to determine one or more estimated dimensions (or measurements) for the pitcher 502 (e.g., currently empty in FIG. 5B), such as the estimated available volume for the pitcher 502, due to the lack of depth information for the pitcher 502 from the current POV. Therefore, continuing with this example, the electronic device 120, the controller 110, a suitable combination of the electronic device 120 and the controller 110, or a component thereof (e.g., the prompt/ interrupt handler 446 in FIG. 4A) generates the audible feedback 516 in order to remedy the aforementioned inability of the electronic device 120 to determine one or more estimated dimensions (or measurements) for the pitcher 502.

As shown in FIG. 5B, during the instance 510 (e.g., associated with time $T_2$) of the first measurement scenario, the electronic device 120, the controller 110, or a suitable combination thereof also generates and displays a bounding box 512 (or other XR overlay) proximate to the pitcher 502 within the XR environment 128 in order to highlight the user's intent to interact with the pitcher 502. For example, the bounding box 512 (or other XR overlay) may correspond to a frame overlay, a glow effect, a spotlight effect, a visual pointer, and/or the like.

Figure 5C:
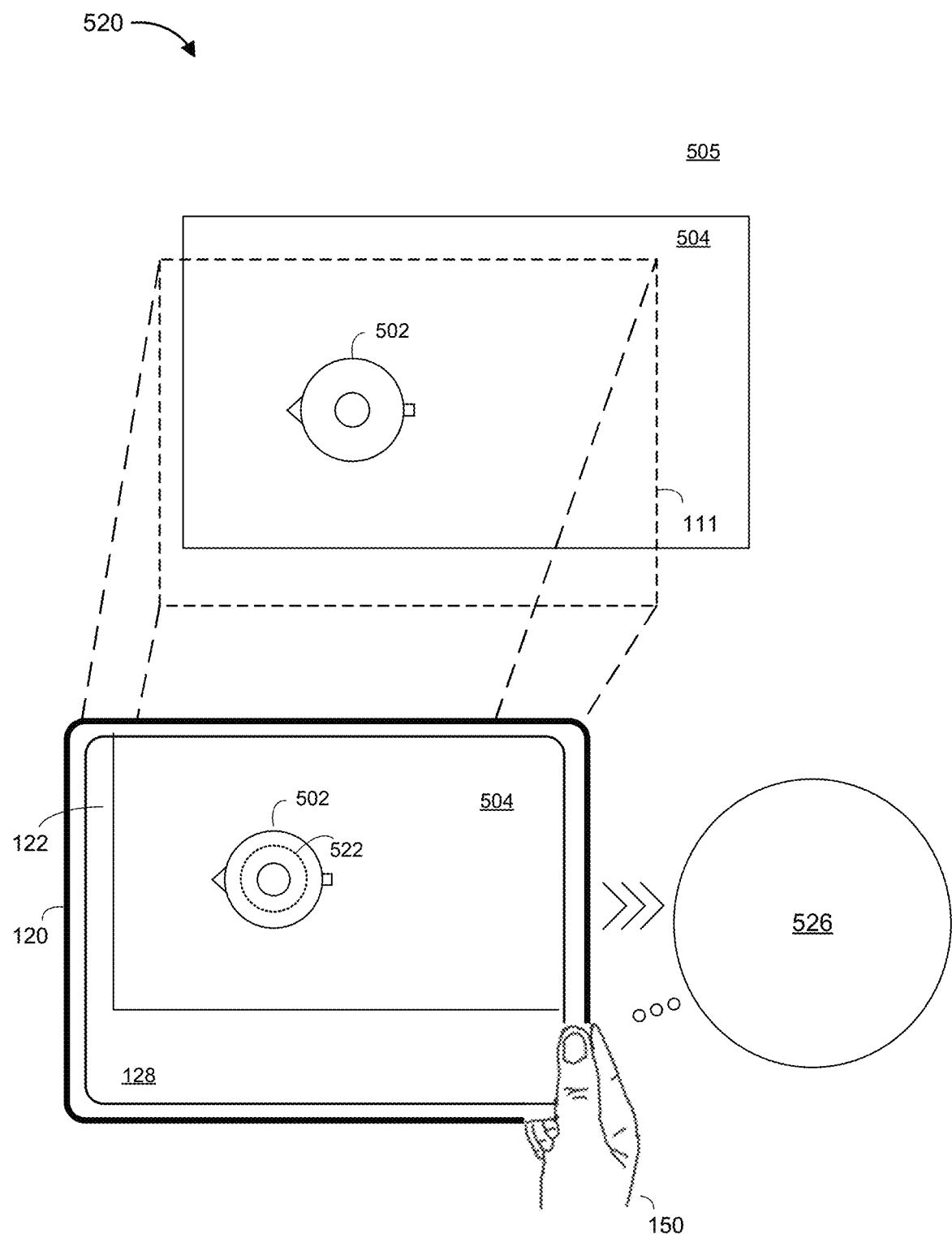
Figure 5D:
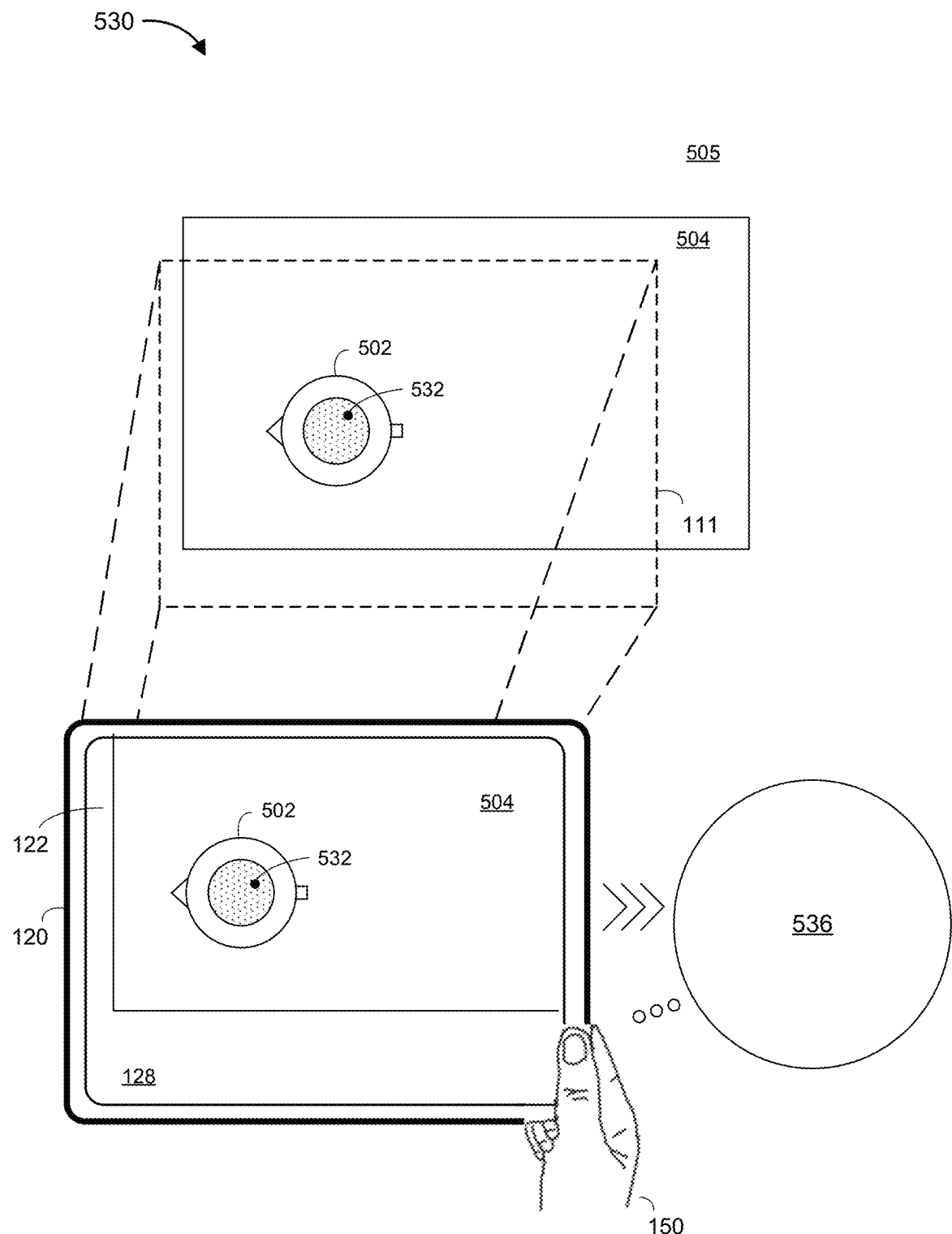

For example, in response to the audible feedback 516 in FIG. 5B, the FOV 111 of an exterior-facing image sensor of the electronic device 120 changes to a top-down view of the pitcher 502 on the countertop 504 in FIGS. 5C and 5D (e.g., the user 150 ambulates to the countertop 504 with the electronic device 120 in hand).

As shown in FIG. 5C, during the instance 520 (e.g., associated with time $T_3$) of the first measurement scenario, the electronic device 120, the controller 110, or a suitable combination thereof outputs audible feedback 526 (e.g., "Estimated available volume for vessel determined. Please start pouring the liquid to the fill line, and I will tell you when to stop.") after determining the one or more estimated dimensions (or measurements) for the pitcher 502 such as its estimated available volume while currently empty. For example, the electronic device 120, the controller 110, a suitable combination of the electronic device 120 and the controller 110, or a component thereof (e.g., the object volume determiner 442 in FIG. 4A) determines the estimated available volume for the empty pitcher 502. Continuing with this example, the electronic device 120, the controller 110, a suitable combination of the electronic device 120 and the controller 110, or a component thereof (e.g., the object the prompt/interrupt handler 446 in FIG. 4A) generates and displays the XR overlay 522 indicating a fill line for water according to the instruction (or a set of instructions) from the user speech input 506 in FIG. 5A (e.g., measure 16 fluid ounces in the pitcher).

For example, in response to the audible feedback 526 in FIG. 5C, the user 150 starts to fill the pitcher 502 with water 532 to accomplish their intended task (e.g., measure 16 fluid ounces in the pitcher). As shown in FIG. 5D, during the instance 530 (e.g., associated with time $T_4$) of the first measurement scenario, the electronic device 120, the controller 110, or a suitable combination thereof outputs audible feedback 536 (e.g., "Please stop pouring. The vessel now contains 16 fluid ounces.") after determining that the estimated current fill volume for the pitcher 502 satisfies the instruction from the user speech input 506 in FIG. 5A (e.g., measure 16 fluid ounces in the pitcher). For example, the electronic device 120, the controller 110, a suitable combination of the electronic device 120 and the controller 110, or a component thereof (e.g., the current fill volume determiner 444 in FIG. 4A) determines an estimated current fill volume of the pitcher 502. Continuing with this example, the electronic device 120, the controller 110, a suitable combination of the electronic device 120 and the controller 110, or a component thereof (e.g., the object the prompt/interrupt handler 446 in FIG. 4A) determines whether the estimated current fill volume of the pitcher 502 satisfies the instruction from the user speech input 506 in FIG. 5A and generates the audible feedback 536.

Figure 5E:
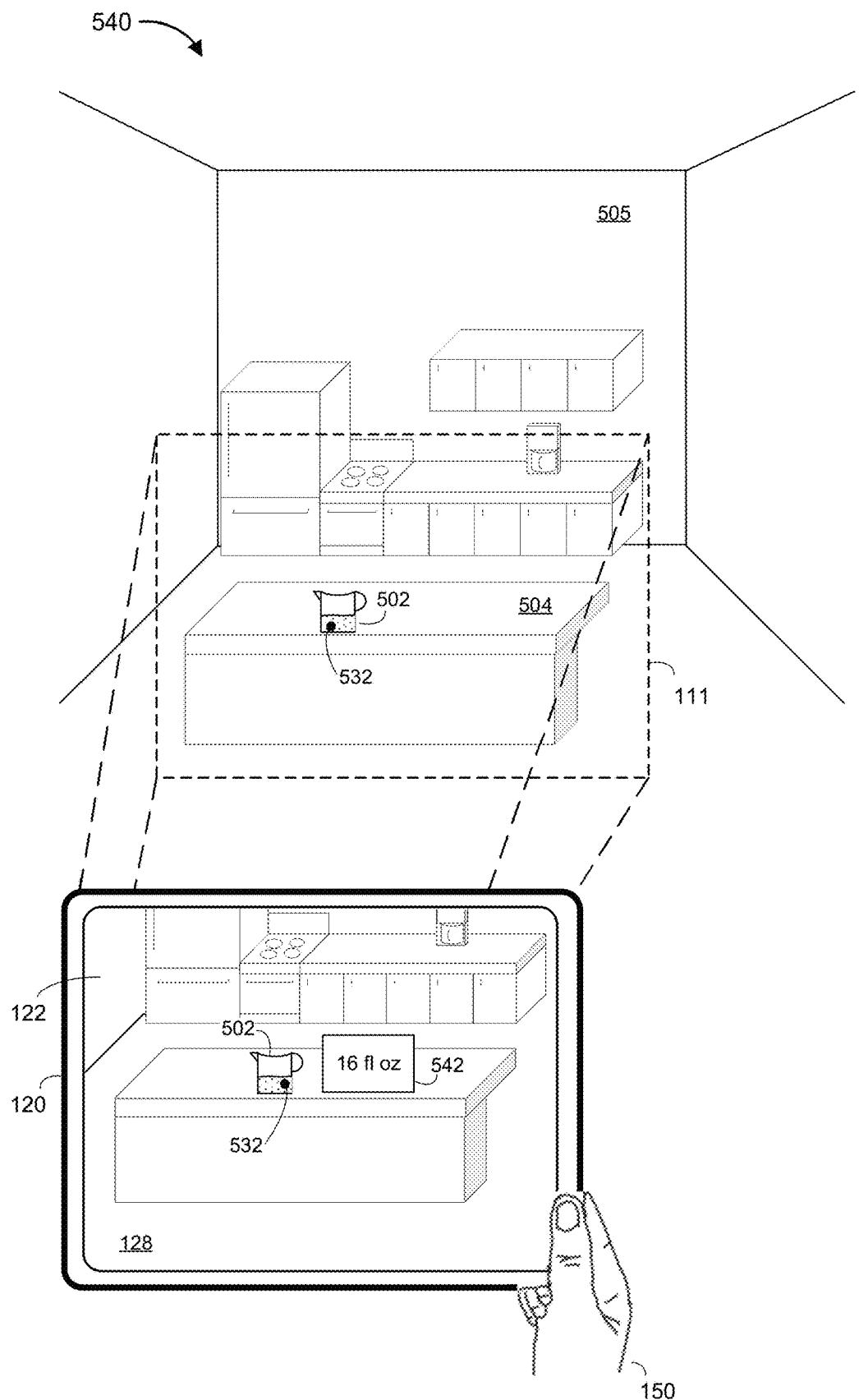

As shown in FIG. 5E, during the instance 540 (e.g., associated with time $T_5$) of the first measurement scenario, the electronic device 120, the controller 110, or a suitable combination thereof generates and displays a visual indicator 542 (or other XR overlay) after determining that the estimated current fill volume for the pitcher 502 satisfies the instruction from the user speech input 506 in FIG. 5A (e.g., measure 16 fluid ounces in the pitcher). For example, the visual indicator 542 (or other XR overlay) indicates that the instruction from the user speech input 506 in FIG. 5A (e.g., measure 16 fluid ounces in the pitcher) is complete and serves as a reminder that the pitcher 502 currently holds 16 fluid ounces of water 532. One of ordinary skill in the art will appreciate that the visual indicator 542 may take myriad forms and be replaced with audible reminder in various other implementations.

FIGS. 6A-6J illustrate a sequence of instances 600, 610, 620, 630, 640, 650, 660, 670, 680, and 690 of a second measurement scenario in accordance with some implementations. While certain specific features are illustrated, those skilled in the art will appreciate from the present disclosure that various other features have not been illustrated for the sake of brevity, and so as not to obscure more pertinent aspects of the implementations disclosed herein.

As shown in FIGS. 6A-6J, the second measurement scenario includes a physical environment 505 and an XR environment 128 displayed on the display 122 of the electronic device 120. The electronic device 120 presents the XR environment 128 to the user 150 while the user 150 is physically present within the physical environment 505 (e.g., a home kitchen) that includes a bowl 614 on a countertop 504 within the FOV 111 of an exterior-facing image sensor of the electronic device 120. As such, in some implementations, the user 150 holds the electronic device 120 in his/her hand(s) similar to the operating environment 100 in FIG. 1.

In other words, in some implementations, the electronic device 120 is configured to present XR content and to enable optical see-through or video pass-through of at least a portion of the physical environment 505 on the display 122. For example, the electronic device 120 corresponds to a mobile phone, tablet, laptop, near-eye system, wearable computing device, or the like.

Figure 6A:
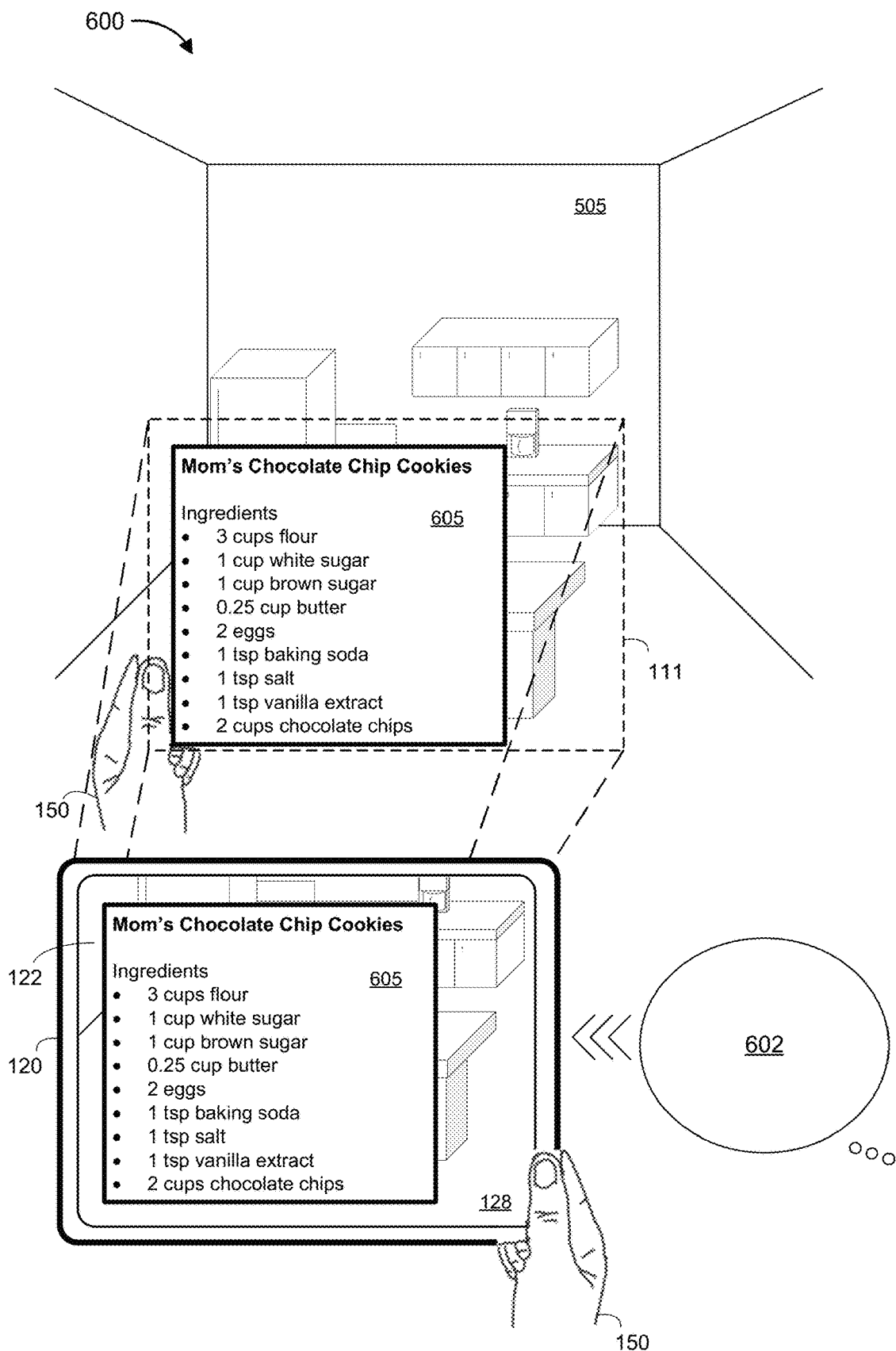
FIGS. 6A-6J illustrate a sequence of instances of a second measurement scenario in accordance with some implementations.

As shown in FIG. 6A, during the instance 600 (e.g., associated with time $T_1$) of the second measurement scenario, the electronic device 120, the controller 110, or a suitable combination thereof detects a user speech input 602 (e.g., "I would like to follow the recipe on this index card.") via one or more microphones. In FIGS. 6A-6D, the FOV 111 of an exterior-facing image sensor of the electronic device 120 corresponds to a perspective view of a bowl 614 on the countertop 504. For example, the electronic device 120, the controller 110, a suitable combination of the electronic device 120 and the controller 110, or a component thereof (e.g., the NLP 432 in FIG. 4A) processes the user speech input 602 by converting the user speech input 602 to text. Continuing with this example, the electronic device 120, the controller 110, a suitable combination of the electronic device 120 and the controller 110, or a component thereof (e.g., the instructions engine 434 in FIG. 4A) determines an instruction or a set of instructions based on the text version of the user speech input 602 and also by performing text/character recognition on the index card 605 within the FOV 111 of an exterior-facing image sensor of the electronic device 120. For example, the electronic device 120, the controller 110, a suitable combination of the electronic device 120 and the controller 110, or a component thereof (e.g., the instructions engine 434 in FIG. 4A) may separate the chocolate chip cookie recipe on the index card 605 into a series of sequential or non-sequential tasks.

Figure 6B:
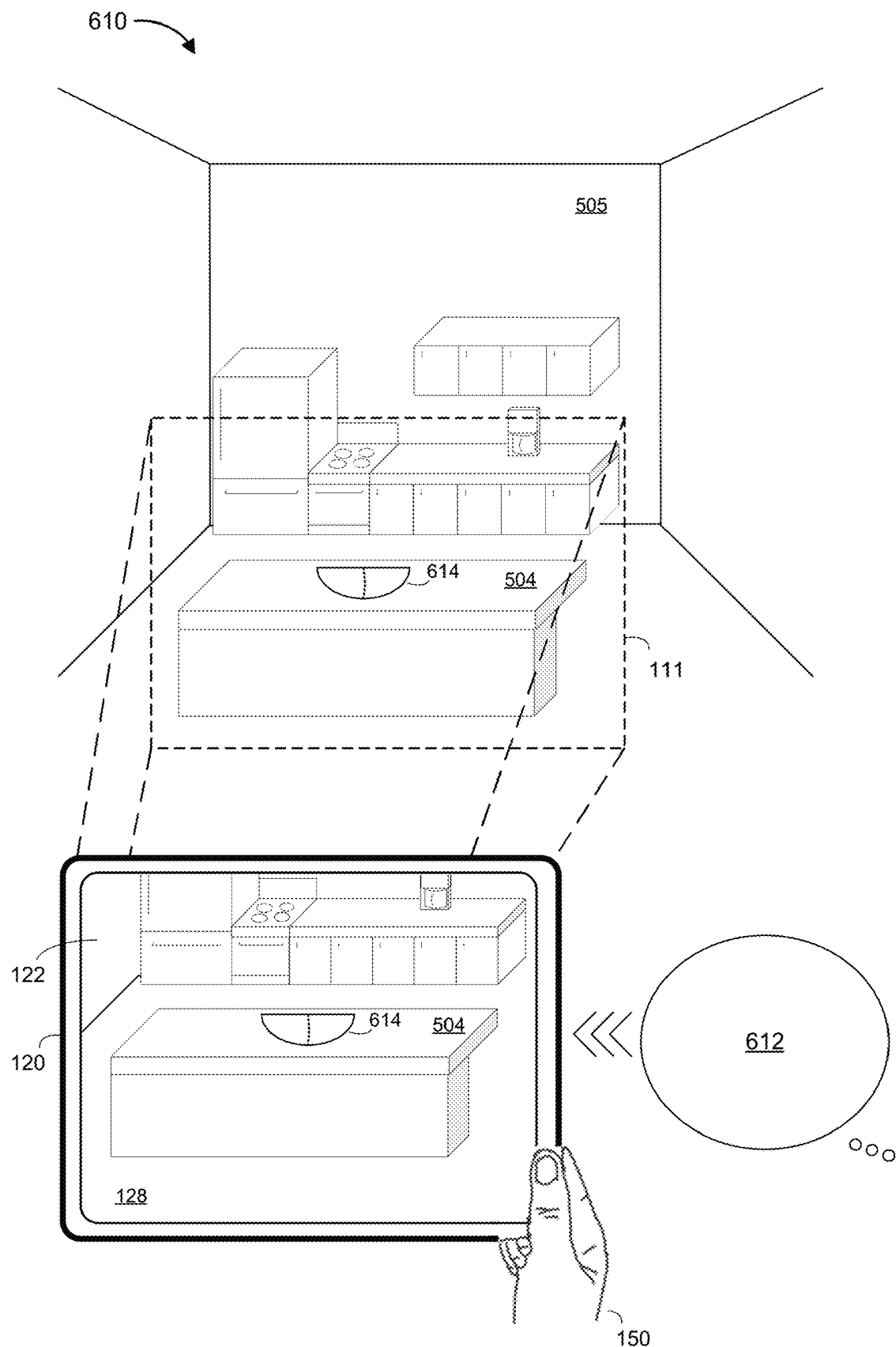

As shown in FIG. 6B, during the instance 610 (e.g., associated with time $T_2$) of the second measurement scenario, the electronic device 120, the controller 110, or a suitable combination thereof detects a user speech input 612 (e.g., "Let's start with the chocolate chips.") via one or more microphones. For example, the electronic device 120, the controller 110, a suitable combination of the electronic device 120 and the controller 110, or a component thereof (e.g., the NLP 432 in FIG. 4A) processes the user speech input 612 by converting the user speech input 612 to text. For example, the electronic device 120, the controller 110, a suitable combination of the electronic device 120 and the controller 110, or a component thereof (e.g., the instructions engine 434 in FIG. 4A) determines that the user 150 intends on starting with a first task relative to the chocolate chip cookie recipe on the index card 605 in FIG. 6A that corresponds to measuring out two cups of chocolate chips.

Figure 6C:
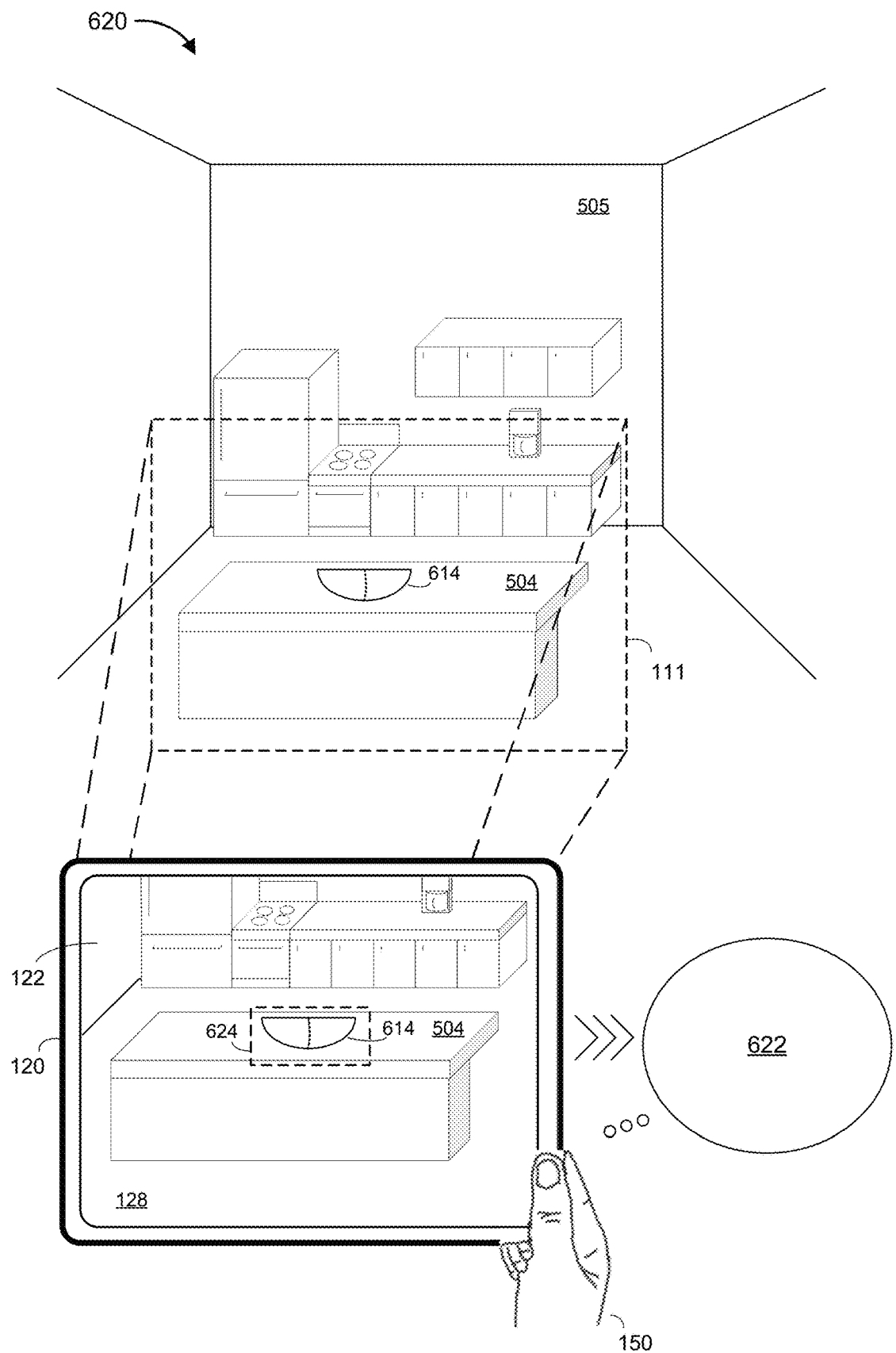

As shown in FIG. 6C, during the instance 620 (e.g., associated with time $T_3$) of the second measurement scenario, the electronic device 120, the controller 110, or a suitable combination thereof outputs audible feedback 622 (e.g., "Please start filling the vessel with 2 cups of chocolate chips. I will tell you when to stop.") in response to detecting the user speech input 612 in FIG. 6B. As shown in FIG. 6C, during the instance 620, the electronic device 120, the controller 110, or a suitable combination thereof also generates and displays a bounding box 624 (or other XR overlay) proximate to the bowl 614 within the XR environment 128 in order to highlight the user's intent to interact with the bowl 614. For example, the bounding box 624 (or other XR overlay) may correspond to a frame overlay, a glow effect, a spotlight effect, a visual pointer, and/or the like.

Figure 6D:
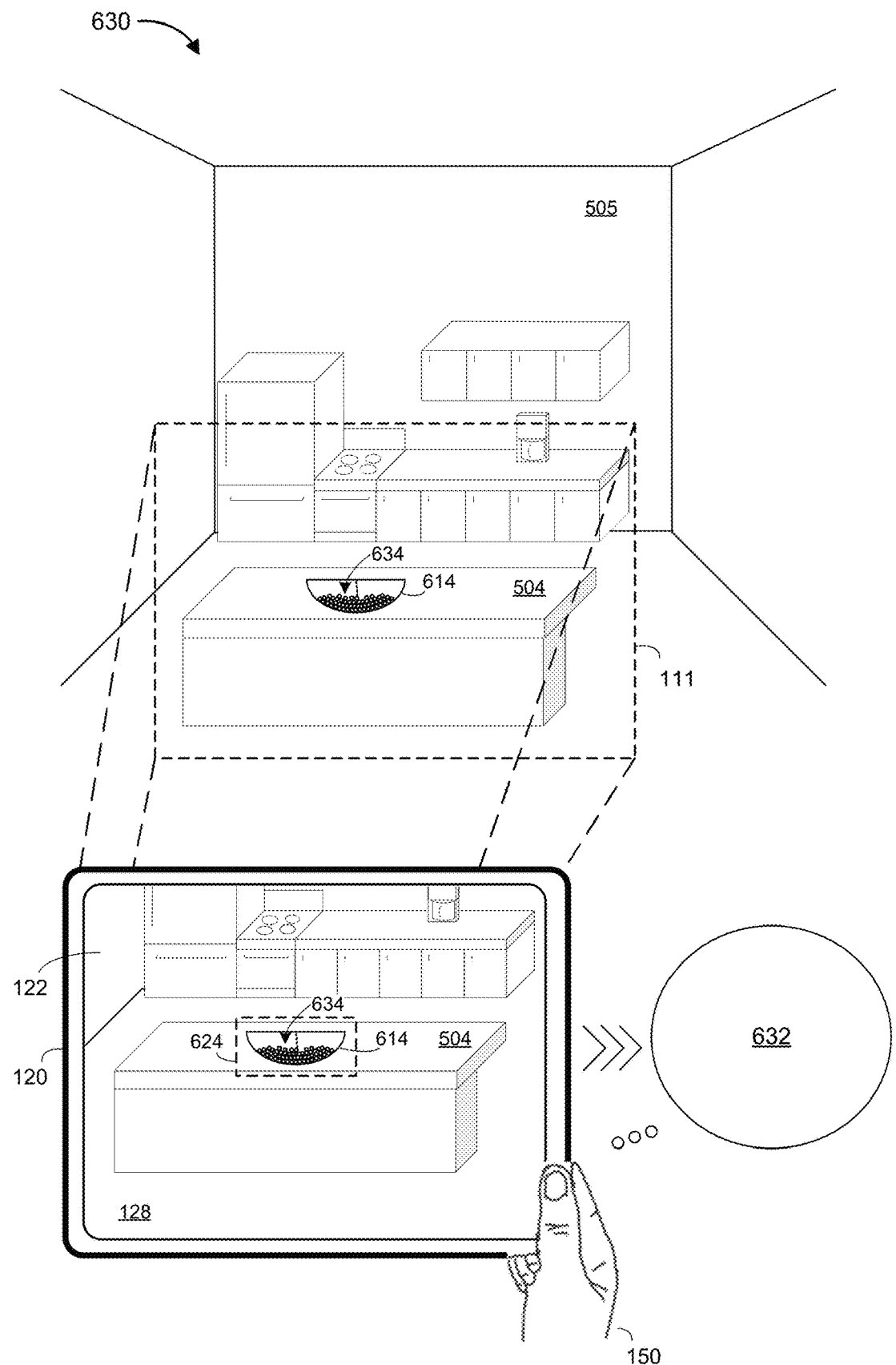

For example, in response to the audible feedback 622 in FIG. 6C, the user 150 starts to fill the bowl 614 with chocolate chips 634 to accomplish their intended task (e.g., measure 2 cups of chocolate chips). As shown in FIG. 6D, during the instance 630 (e.g., associated with time $T_4$) of the second measurement scenario, the electronic device 120, the controller 110, or a suitable combination thereof outputs audible feedback 632 (e.g., "I cannot estimate the current volume of chocolate chips in the vessel. Please show me a different angle of the vessel.") after determining that the estimated current fill volume for the bowl 614 is incalculable. For example, the electronic device 120, the controller 110, a suitable combination of the electronic device 120 and the controller 110, or a component thereof (e.g., the object volume determiner 442 in FIG. 4A) was able to determine one or more estimated dimensions (or measurements) for the bowl 614 while empty in FIG. 6C. However, in this example, the electronic device 120, the controller 110, a suitable combination of the electronic device 120 and the controller 110, or a component thereof (e.g., the current fill volume determiner 444 in FIG. 4A) is unable to determine the estimated current fill volume for the bowl 614 due to the lack of depth information for the bowl 614 from the current POV. Therefore, continuing with this example, the electronic device 120, the controller 110, a suitable combination of the electronic device 120 and the controller 110, or a component thereof (e.g., the prompt/interrupt handler 446 in FIG. 4A) generates the audible feedback 632 in order to remedy the aforementioned inability of the electronic device 120 to determine the estimated current fill volume for the bowl 614.

Figure 6E:
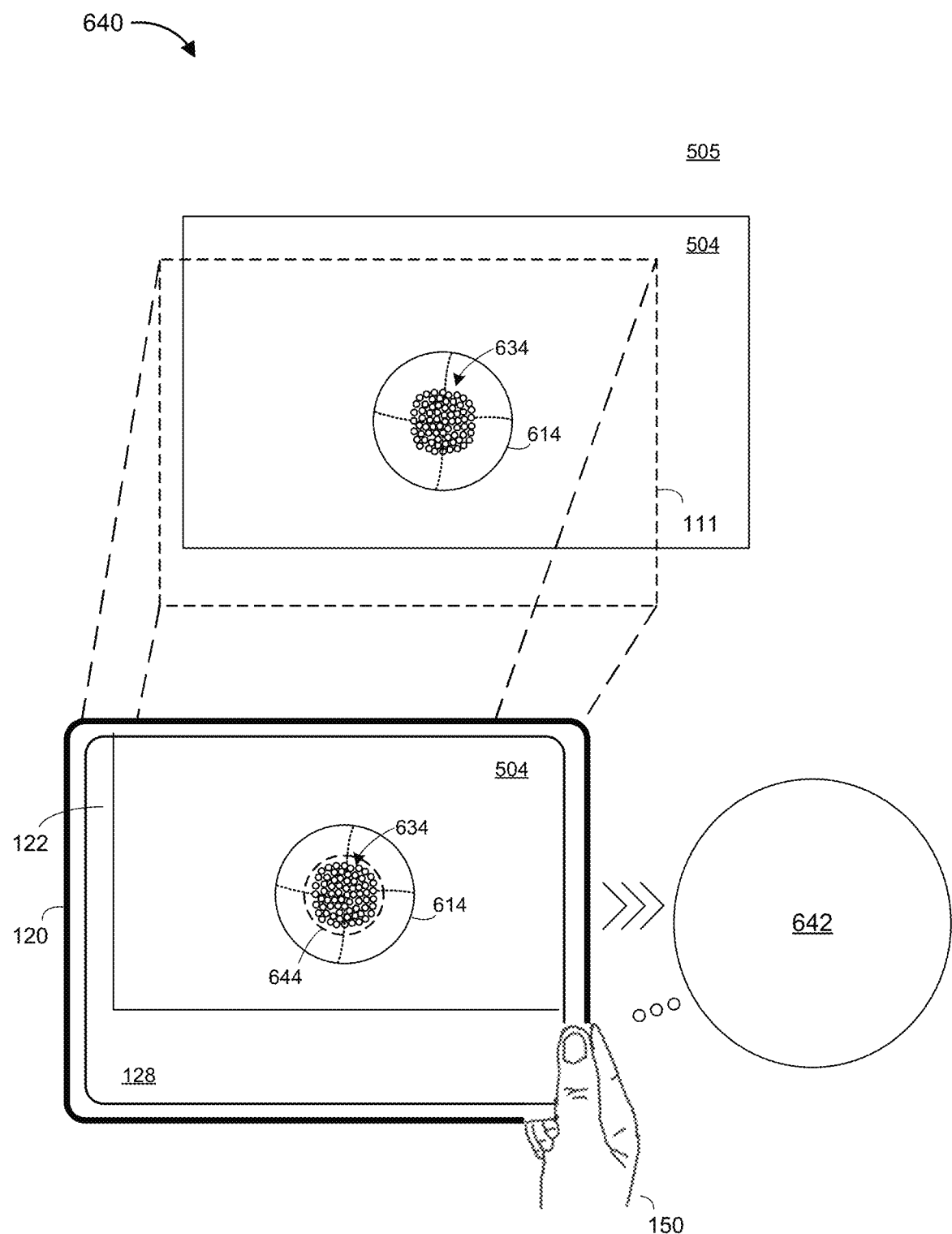
Figure 6F:
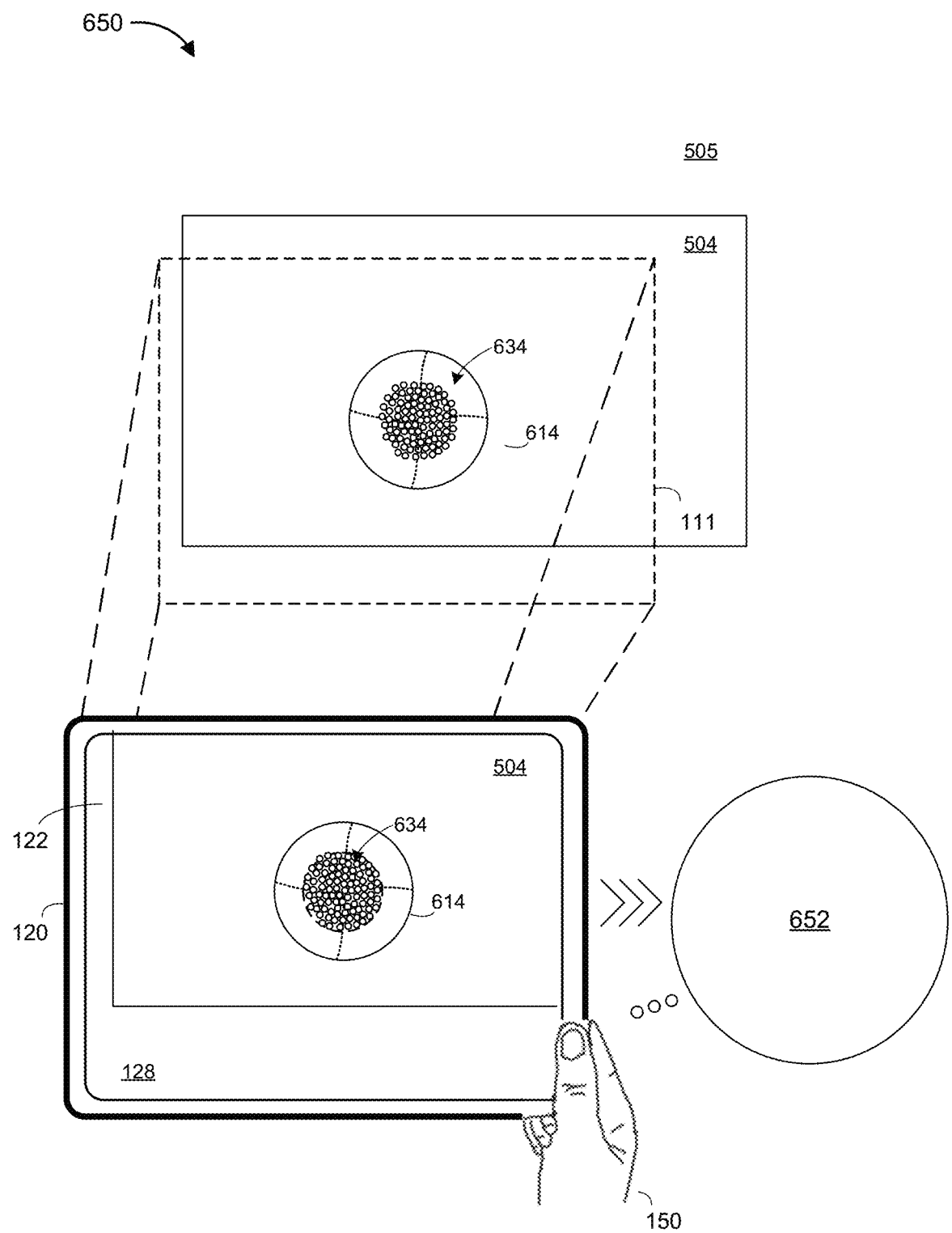

For example, in response to the audible feedback 632 in FIG. 6D, the FOV 111 of an exterior-facing image sensor of the electronic device 120 changes to a top-down view of the bowl 614 on the countertop 504 in FIGS. 6E and 6F (e.g., the user 150 ambulates to the countertop 504 with the electronic device 120 in hand).

As shown in FIG. 6E, during the instance 640 (e.g., associated with time $T_5$) of the second measurement scenario, the electronic device 120, the controller 110, or a suitable combination thereof outputs audible feedback 642 (e.g., "You are very close to two cups of chocolate chips. Only add a bit more by following the fill line.") after determining that the estimated current fill volume for the bowl 614 does not satisfy the task from the user speech input 612 in FIG. 6B (e.g., measure 2 cups of chocolate chips). For example, the electronic device 120, the controller 110, a suitable combination of the electronic device 120 and the controller 110, or a component thereof (e.g., the current fill volume determiner 444 in FIG. 4A) determines an estimated current fill volume of the chocolate chips 634 within the bowl 614. Continuing with this example, the electronic device 120, the controller 110, a suitable combination of the electronic device 120 and the controller 110, or a component thereof (e.g., the object the prompt/interrupt handler 446 in FIG. 4A) determines whether the estimated current fill volume of the chocolate chips 634 within the bowl 614 satisfies the task from the user speech input 612 in FIG. 6B and generates the audible feedback 642. Further continuing with this example, the electronic device 120, the controller 110, a suitable combination of the electronic device 120 and the controller 110, or a component thereof (e.g., the object the prompt/interrupt handler 446 in FIG. 4A) generates and displays the XR overlay 644 indicating a fill line for the appropriate amount of the chocolate chips 634.

For example, in response to the audible feedback 642 in FIG. 6E, the user 150 adds more chocolate chips 634 to the bowl 614 to accomplish their intended task (e.g., measure 2 cups of chocolate chips). As shown in FIG. 6F, during the instance 650 (e.g., associated with time $T_6$) of the second measurement scenario, the electronic device 120, the controller 110, or a suitable combination thereof outputs audible feedback 652 (e.g., "Please stop now, unless you intend to exceed the recipe's recommended amount of chocolate chips.") after determining that the estimated current fill volume of the chocolate chips 634 within the bowl 614 satisfies the task from the user speech input 612 in FIG. 6B. For example, the electronic device 120, the controller 110, a suitable combination of the electronic device 120 and the controller 110, or a component thereof (e.g., the current fill volume determiner 444 in FIG. 4A) determines an estimated current fill volume of the chocolate chips 634 within the bowl 614. Continuing with this example, the electronic device 120, the controller 110, a suitable combination of the electronic device 120 and the controller 110, or a component thereof (e.g., the object the prompt/interrupt handler 446 in FIG. 4A) determines whether the estimated current fill volume of the chocolate chips 634 within the bowl 614 satisfies the first task from the user speech input 612 in FIG. 6B and generates the audible feedback 652.

Figure 6G:
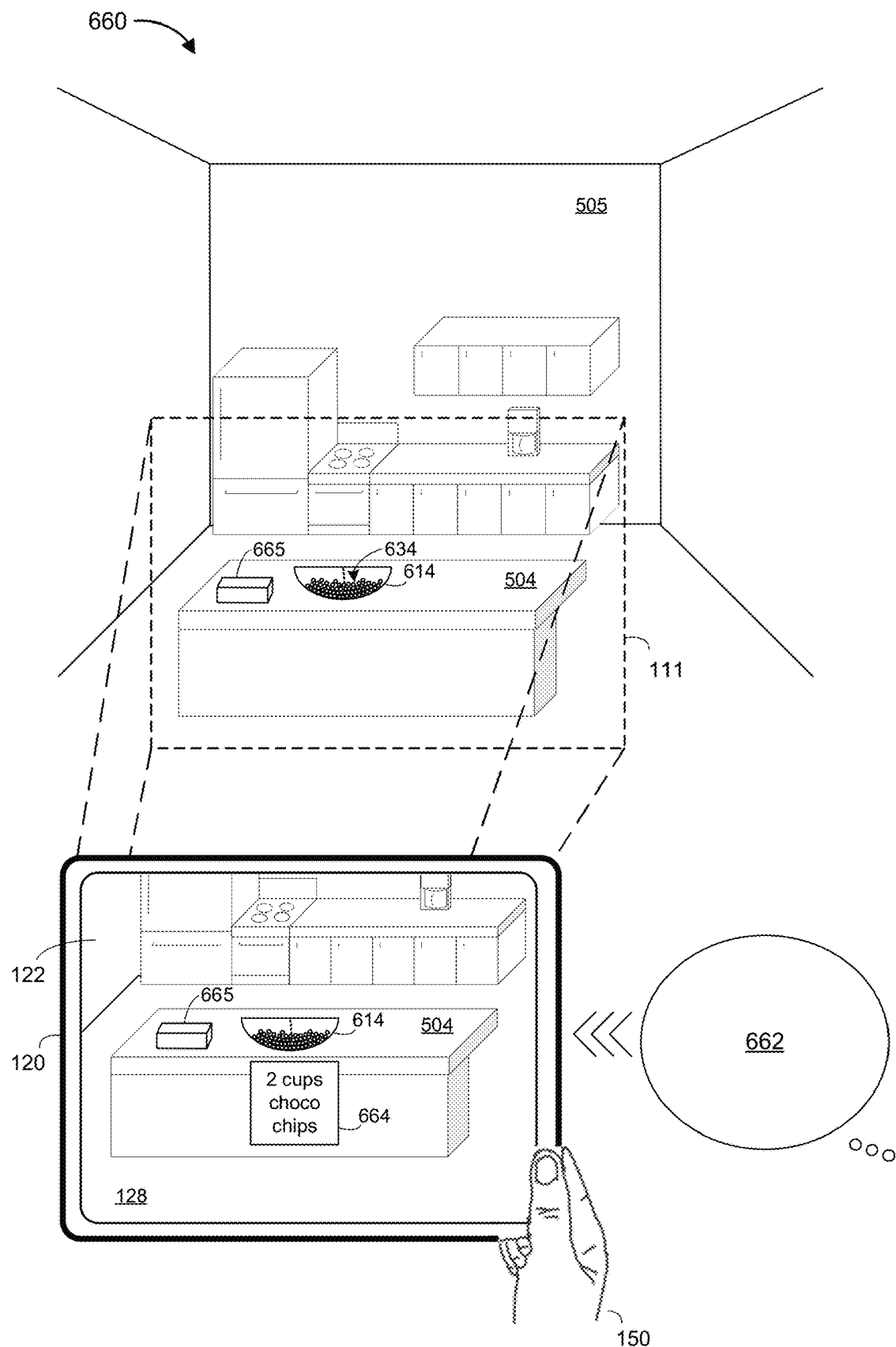

As shown in FIG. 6G, during the instance 660 (e.g., associated with time $T_7$) of the second measurement scenario, the electronic device 120, the controller 110, or a suitable combination thereof generates and displays a visual indicator 664 (or other XR overlay) after determining that the estimated current fill volume for the bowl 614 satisfies the task from the user speech input 612 in FIG. 6B (e.g., measure 2 cups of chocolate chips). For example, the visual indicator 664 (or other XR overlay) indicates that the task from the user speech input 612 in FIG. 6B is complete and serves as a reminder that the bowl 614 currently holds 2 cups of chocolate chips. One of ordinary skill in the art will appreciate that the visual indicator 664 may take myriad forms and be replaced with audible reminder in various other implementations.

As shown in FIG. 6G, during the instance 660 (e.g., associated with time $T_7$) of the second measurement scenario, the electronic device 120, the controller 110, or a suitable combination thereof also detects a user speech input 662 (e.g., "Let's move onto the butter. Please mark out a quarter cup of butter for me") via one or more microphones. For example, the electronic device 120, the controller 110, a suitable combination of the electronic device 120 and the controller 110, or a component thereof (e.g., the NLP 432 in FIG. 4A) processes the user speech input 662 by converting the user speech input 662 to text. For example, the electronic device 120, the controller 110, a suitable combination of the electronic device 120 and the controller 110, or a component thereof (e.g., the instructions engine 434 in FIG. 4A) determines that the user 150 intends on moving onto a second task relative to the chocolate chip cookie recipe on the index card 605 in FIG. 6A that corresponds to measuring out 0.25 cup of butter. In FIG. 6G, a whole stick of butter 665 is present within the physical environment 505. In this example, the whole stick of butter 665 is located on the countertop 504.

Figure 6H:
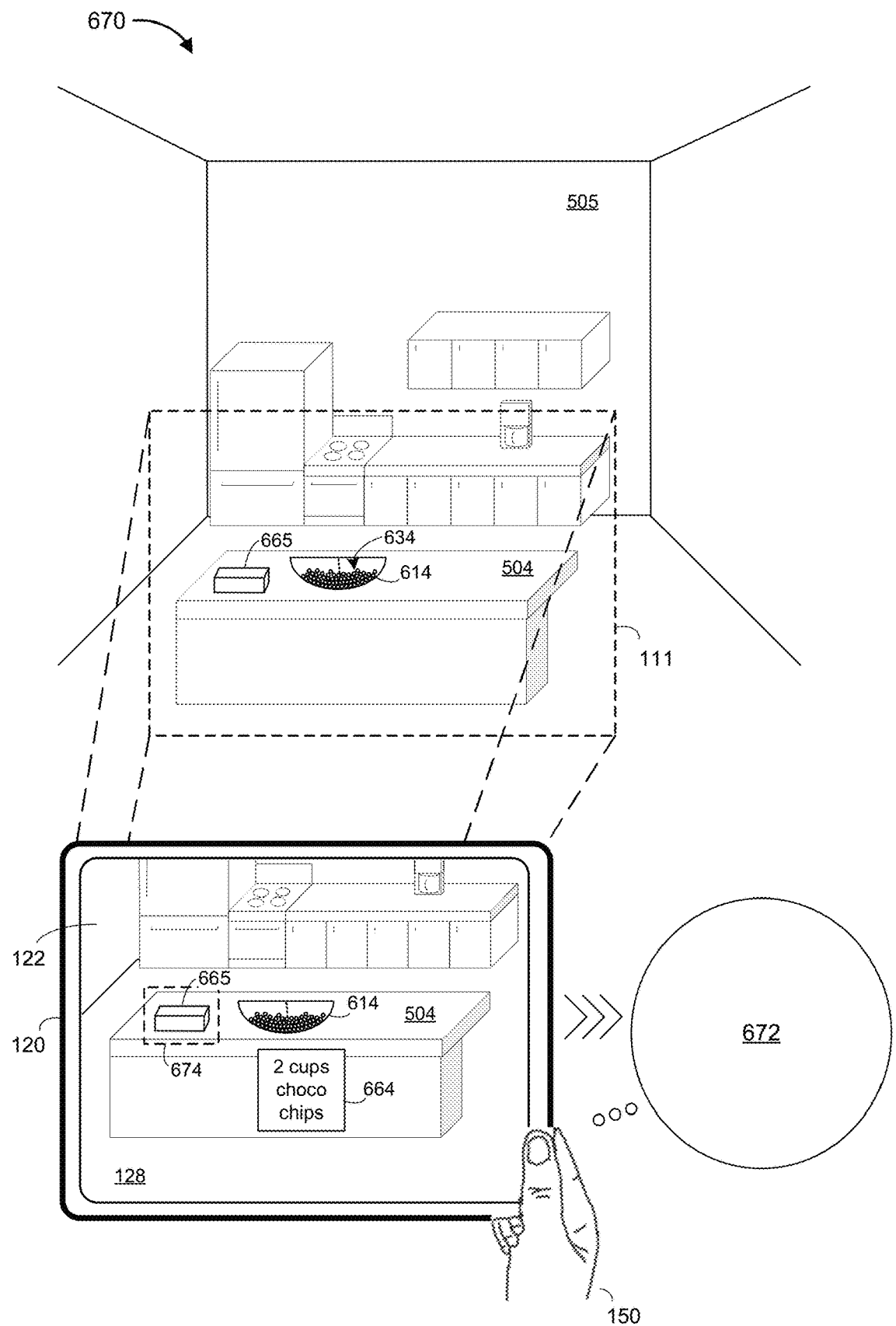

As shown in FIG. 6H, during the instance 670 (e.g., associated with time $T_8$) of the second measurement scenario, the electronic device 120, the controller 110, or a suitable combination thereof outputs audible feedback 672 (e.g., "Please show a top-down view of the butter for an accurate apportionment marker.") in response to detecting the user speech input 662 in FIG. 6G. As shown in FIG. 6H, during the instance 670, the electronic device 120, the controller 110, or a suitable combination thereof also generates and displays a bounding box 674 (or other XR overlay) proximate to the whole stick of butter 665 within the XR environment 128 in order to highlight the user's intent to interact with the whole stick of butter 665. For example, the bounding box 674 (or other XR overlay) may correspond to a frame overlay, a glow effect, a spotlight effect, a visual pointer, and/or the like.

Figure 6I:
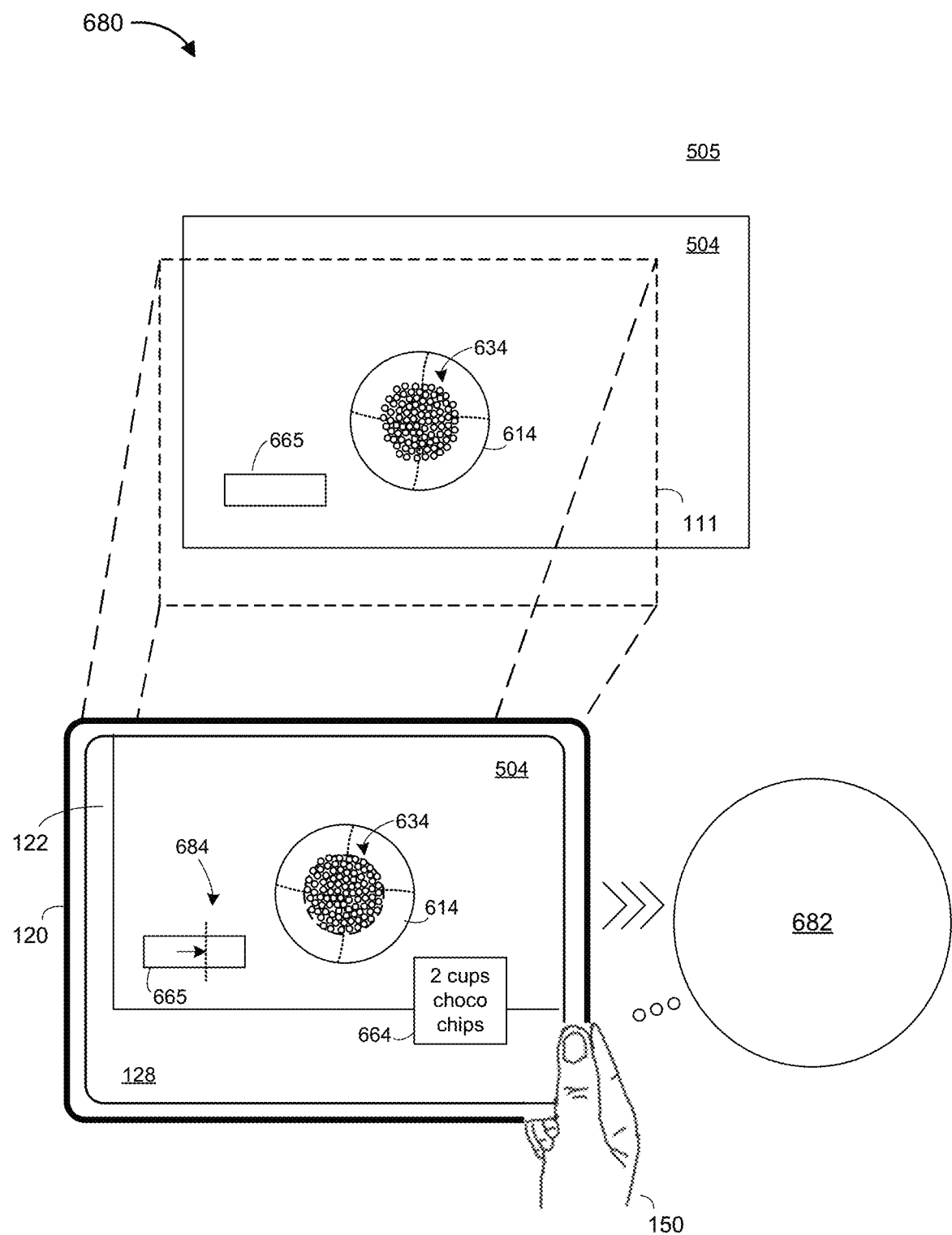
Figure 6J:
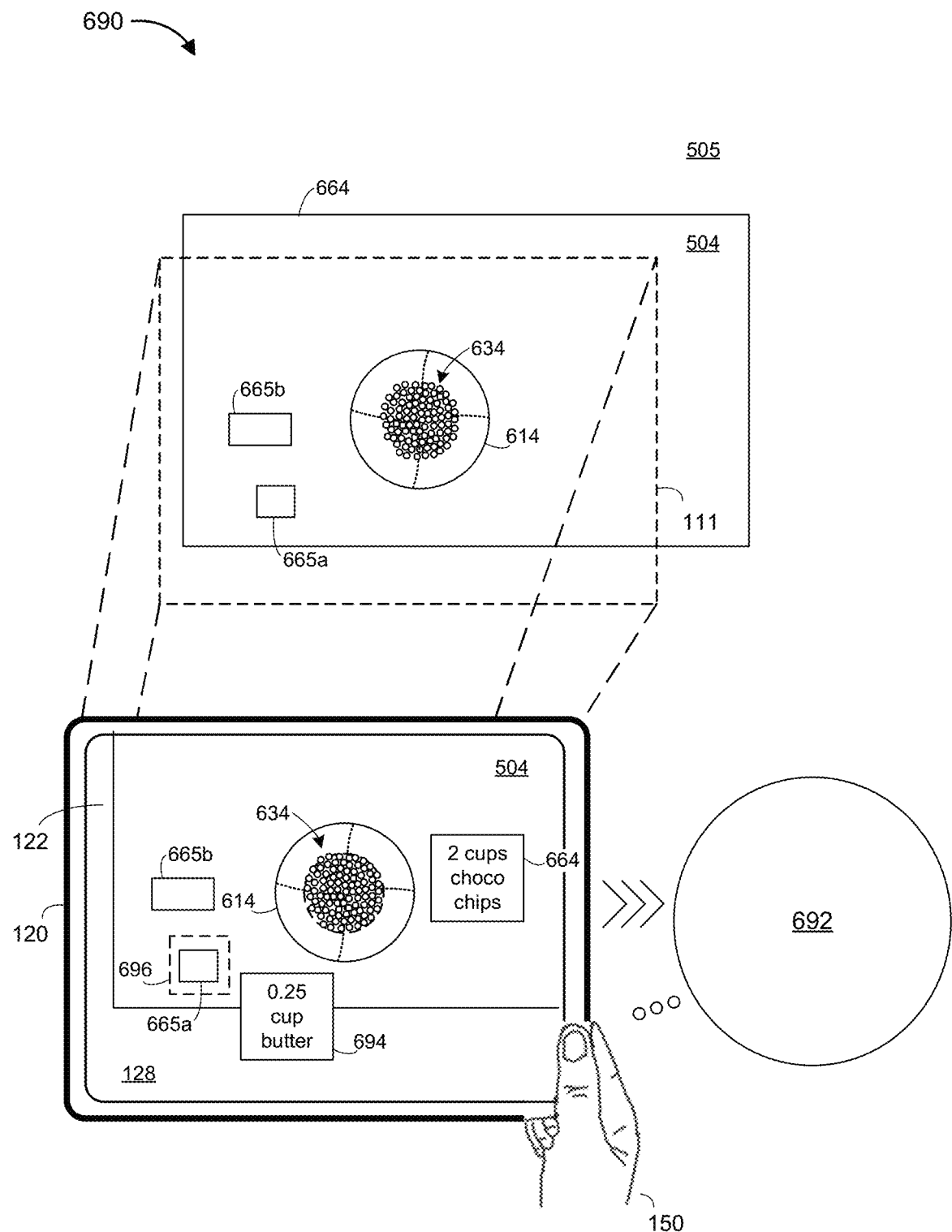

For example, in response to the audible feedback 672 in FIG. 6H, the FOV 111 of an exterior-facing image sensor of the electronic device 120 changes to a top-down view of the countertop 504 including the whole stick of butter 665 and the bowl 614 in FIGS. 6I and 6J (e.g., the user 150 ambulates to the countertop 504 with the electronic device 120 in hand).

As shown in FIG. 6I, during the instance 680 (e.g., associated with time $T_9$) of the second measurement scenario, the electronic device 120, the controller 110, or a suitable combination thereof outputs audible feedback 682 (e.g., "Please cut the stick of butter at the apportionment marker and use the portion to the right of the arrow.") after determining the one or more estimated dimensions (or measurements) for the whole stick of butter 665 such as its estimated mass. For example, the electronic device 120, the controller 110, a suitable combination of the electronic device 120 and the controller 110, or a component thereof (e.g., the object volume determiner 442 in FIG. 4A) determines the estimated mass of the whole stick of butter 665. Continuing with this example, the electronic device 120, the controller 110, a suitable combination of the electronic device 120 and the controller 110, or a component thereof (e.g., the object the prompt/interrupt handler 446 in FIG. 4A) generates the XR overlay 684 indicating an apportionment marker for measuring out 0.25 cup of butter from the whole stick of butter 665.

For example, in response to the audible feedback 682 in FIG. 6I, the user 150 cuts the whole stick of butter 665 into portions 665a and 665b to accomplish their intended task (e.g., measure 0.25 cup of butter). As shown in FIG. 6J, during the instance 690 (e.g., associated with time $T_{10}$) of the second measurement scenario, the electronic device 120, the controller 110, or a suitable combination thereof outputs audible feedback 692 (e.g., "Well done! Please keep the highlighted portion of the butter for the recipe.") after determining that the estimated mass of the portion 665a of the whole stick of butter 665 satisfies the second task relative to the chocolate chip cookie recipe on the index card 605 in FIG. 6A associated with measuring out 0.25 cup of butter.

As shown in FIG. 6J, during the instance 690, the electronic device 120, the controller 110, or a suitable combination thereof also generates and displays a visual indicator 694 (or other XR overlay) after determining that the portion of butter 665a satisfies the task from the user speech input 662 in FIG. 6G (e.g., measure 0.25 cup of butter). For example, the visual indicator 694 (or other XR overlay) indicates that the task from the user speech input 662 in FIG. 6G is complete and serves as a reminder that the portion of butter 665a corresponds to 0.25 cup of butter. One of ordinary skill in the art will appreciate that the visual indicator 694 may take myriad forms and be replaced with audible reminder in various other implementations.

As shown in FIG. 6J, during the instance 690, the electronic device 120, the controller 110, or a suitable combination thereof further generates and displays a bounding box 696 (or other XR overlay) proximate to the portion of butter 665a within the XR environment 128 in order to highlight its correspondence with the visual indicator 694. For example, the bounding box 696 (or other XR overlay) may correspond to a frame overlay, a glow effect, a spotlight effect, a visual pointer, and/or the like.

Figure 7:
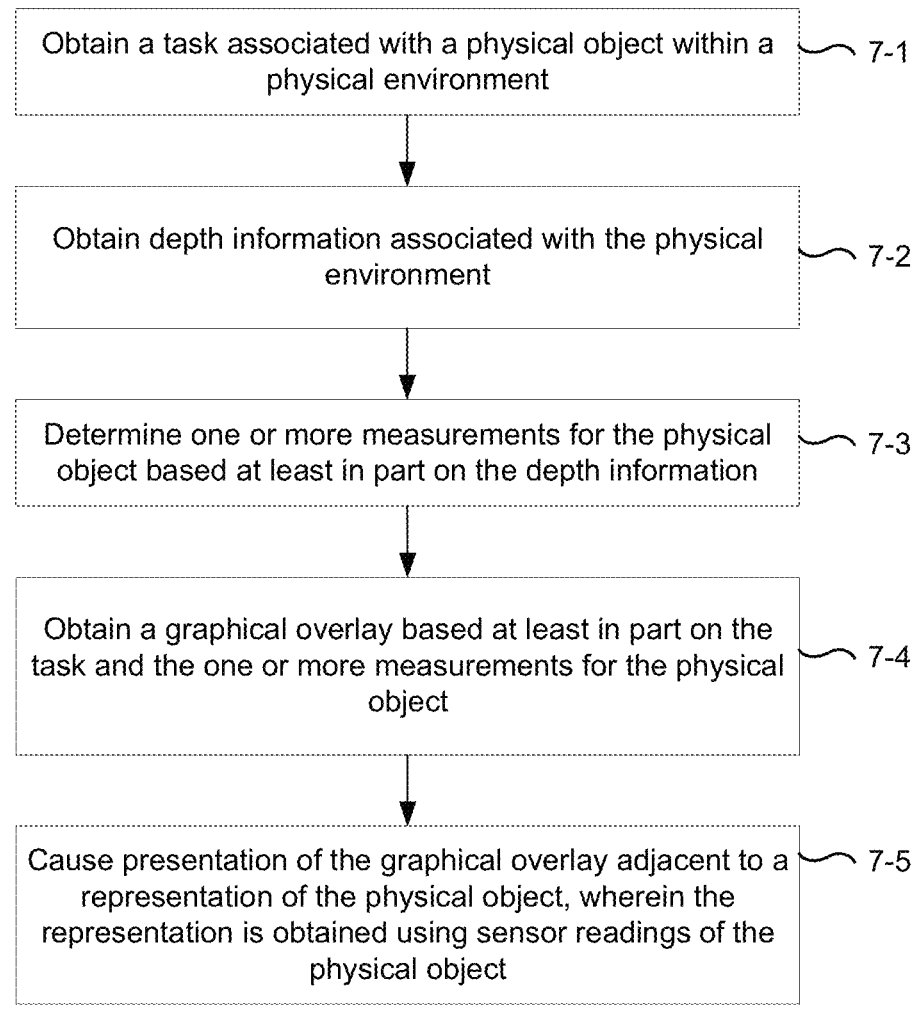
FIG. 7 is a flowchart representation of a method of measuring physical objects to accomplish an associated task in accordance with some implementations.

FIG. 7 is a flowchart representation of a method 700 of measuring physical objects in accordance with some implementations. In various implementations, the method 700 is performed by an electronic device including one or more processors, non-transitory memory, and a depth sensor (e.g., the controller 110 in FIGS. 1 and 2; the electronic device 120 in FIGS. 1 and 3; or a suitable combination thereof), or a component thereof. In some implementations, the method 700 is performed by processing logic, including hardware, firmware, software, or a combination thereof. In some implementations, the method 700 is performed by a processor executing code stored in a non-transitory computer-readable medium (e.g., a memory). In various implementations, some operations in method 700 are, optionally, combined and/or the order of some operations is, optionally, changed.

In some instances, as noted above, eyeballing volume and mass measurements for cooking or home improvement projects can be futile at best. Furthermore, estimating volume and mass measurements with a single camera is likewise a difficult task. In various implementations, a system estimates volume, dimensions, surface area, mass, and/or the like of a physical object by using an onboard depth sensor and/or image sensor. The estimates may also be accompanied with extended reality (XR) markers to aid a user in completing a cooking task, home improvement task, or the like.

As represented by block 7-1, the method 700 includes obtaining (e.g., receiving, retrieving, or determining/generating) a task associated with a physical object with a physical environment. For example, the task corresponds to an instruction, a portion of a set of instructions, or the end result of the set of instructions. As one example, the task corresponds to measuring out or apportioning a portion of the physical object, such as a stick of butter, for a recipe. As another example, the task corresponds to pouring a set amount of liquid into the physical object—a vessel such as a measuring cup, mixing bowl, or the like. In some implementations, the task is provided by the user via voice input such as "I'd like to fill this cup with 16 ounces of water." In some implementations, the task is inferred from a recipe card or other list based at least in part on text/object recognition, semantic segmentation, or the like. In some implementations, the task corresponds to eating the physical object and the XR overlay estimates the calories and nutritional profile for the physical object.

FIGS. 5A-5E illustrate a sequence of example instances of a first measurement scenario according to a first set of instructions (e.g., a verbal user request to fill a cup with X fluid ounces of water) in accordance with some implementations. In this example, the user 150 completes a single task related to measuring out 16 fluid ounces of water into the pitcher 502 Similarly, FIGS. 6A-6J illustrate a sequence of example instances of a second measurement scenario according to a second set of instructions (e.g., a physical index card with a chocolate chip cookie recipe thereon) in accordance with some implementations. In this example, the user 150 completes two separate tasks related to chocolate chip cookie recipe: (A) measuring out two cups of chocolate chips 634 into a bowl 614 in FIGS. 6B-6F; and (B) measuring out a quarter cup of butter from a whole stick of butter 665 in FIGS. 6G-6I.

In some implementations, obtaining the task includes performing text recognition on a physical or virtual object that includes a set of instructions. As one example, the task is obtained from a physical recipe card, a recipe on a website, a recipe in an email, or the like. In FIG. 6A, for example, the electronic device or a component thereof (e.g., the instructions engine 434 in FIG. 4A) determines an instruction or a set of instructions based on a text version of the user speech input 602 in FIG. 6A and also by performing text/character recognition on the index card 605 within the FOV 111 of an exterior-facing image sensor of the electronic device 120. For example, the electronic device or a component thereof (e.g., the instructions engine 434 in FIG. 4A) may separate the chocolate chip cookie recipe on the index card 605 into a series of sequential or non-sequential tasks.

In some implementations, obtaining the task includes performing natural language processing on speech data associated with a set of instructions. In FIG. 5A, for example, the electronic device or a component thereof (e.g., the instructions engine 434 in FIG. 4A) determines an instruction (or a set of instructions) based on the text version of the user speech input 506 (e.g., measure 16 fluid ounces in the pitcher).

In some implementations, the task corresponds to apportioning the physical object. In some implementations, the XR overlay indicates a manner in which to apportion the physical object in order to achieve the task. For example, the XR overlay corresponds to a marker for measuring out 1 tablespoon of butter, 0.25 pounds of a wheel of cheese, or the like. In FIG. 6I, for example, the electronic device or a component thereof (e.g., the object the prompt/interrupt handler 446 in FIG. 4A) generates the XR overlay 684 indicating an apportionment marker for measuring out 0.25 cup of butter from the whole stick of butter 665.

In some implementations, the physical object corresponds to a vessel, and the task corresponds to filling the physical object with another physical object (e.g., a liquid, semi-liquid, solid, or semi-solid substance such as water, oil, flour, seeds, chocolate chips, or the like). In some implementations, the XR overlay indicates a manner in which to fill the physical object in order to achieve the task. For example, the XR overlay corresponds to a marker for 16 fluid ounces of water, 2 cups of chocolate chips, or the like relative to the vessel size. In FIG. 5C, for example, the electronic device or a component thereof (e.g., the object the prompt/interrupt handler 446 in FIG. 4A) generates and displays the XR overlay 522 indicating a fill line for water according to the instruction (or a set of instructions) from the user speech input 506 in FIG. 5A (e.g., measure 16 fluid ounces in the pitcher). As another example, in FIG. 6E, the electronic device or a component thereof (e.g., the object the prompt/interrupt handler 446 in FIG. 4A) generates and displays the XR overlay 644 indicating a fill line for the appropriate amount of the chocolate chips 634 according to the recipe card 605 in FIG. 6A.

As represented by block 7-2, the method 700 includes obtaining depth information, via the depth sensor, associated with a physical object in a physical setting. In some implementations, the depth information is collected by a depth sensor using techniques known in the art such as structured light, time-of-flight, LiDAR, or the like. In some implementations, the depth information corresponds to a mesh, point cloud, or the like of the physical environment. In some implementations, the depth information corresponds to a mesh, point cloud, or the like of a portion of the physical environment such as one or more physical objects that the user intends on interacting with. For example, with reference to FIGS. 5A-5E, the electronic device obtains depth information associated with the physical environment 505 (e.g., the home kitchen) or one or more physical objects therein (e.g., the pitcher 502).

In some implementations, the depth information corresponds to a mesh for at least the physical object. In some implementations, the electronic device obtains (e.g., receives, retrieves, or determines/generates) a mesh that represents the physical environment (including the physical object) or at least the physical object itself.

In some implementations, the depth information corresponds to a point cloud for at least the physical object. In some implementations, the electronic device obtains (e.g., receives, retrieves, or determines/generates) a point cloud that represents the physical environment (including the physical object) or at least the physical object itself.

As represented by block 7-3, the method 700 includes determining one or more measurements for the physical object based at least in part on the depth information. For example, the electronic device estimates the available (or unfilled) volume of a mixing bowl, a measuring cup, a stick of butter, etc. In some implementations, the electronic device may also leverage other input devices, such as an image sensor (for computer vision purposes), to determine the one or more measurements more accurately. In some implementations, the electronic device may prompt the user for additional angles or perspectives of the physical object if the one or more measurements cannot be determined.

In some implementations, the one or more measurements correspond to at least one of a volume of the physical object, spatial dimensions of the physical object, a mass of the physical object, or a surface area of the physical object.

As shown in FIGS. 5A-5C, for example, the electronic device or a component thereof (e.g., the object volume determiner 442 in FIG. 4A) determines the estimated available volume for the empty pitcher 502. However, in FIG. 5B, the electronic device or a component thereof outputs audible feedback 516 (e.g., "Cannot estimate vessel's volume from the current view. Please get close and view the vessel from additional angles.") in response to detecting the user speech input 506 in FIG. 5A. For example, the electronic device 120, the controller 110, a suitable combination of the electronic device 120 and the controller 110, or a component thereof (e.g., the object volume determiner 442 in FIG. 4A) is unable to determine one or more estimated dimensions (or measurements) for the pitcher 502 (e.g., currently empty in FIG. 5B), such as the estimated available volume for the pitcher 502, due to the lack of depth information for the pitcher 502 from the current POV. Therefore, continuing with this example, the electronic device 120, the controller 110, a suitable combination of the electronic device 120 and the controller 110, or a component thereof (e.g., the prompt/interrupt handler 446 in FIG. 4A) generates the audible feedback 516 in order to remedy the aforementioned inability of the electronic device 120 to determine one or more estimated dimensions (or measurements) for the pitcher 502.

As represented by block 7-4, the method 700 includes obtaining (e.g., receiving, retrieving, or determining/generating) a graphical overlay based at least in part on the task and the one or more measurements for the physical object. For example, the graphical overlay corresponds to an XR overlay obtained from the virtual content library 461. In another example, the graphical overlay corresponds to an XR overlay that is generated on-the-fly.

As represented by block 7-5, the method 700 includes causing presentation of the graphical overlay adjacent to a representation of the physical object, wherein the representation is obtained using sensor readings of the physical object. In some implementations, the XR overlay is composited with video pass-through or optical see-through of a physical environment including the physical object. In some implementations, the graphical overlay occludes the physical object. In some implementations, the graphical overlay is presented adjacent to (but not overlapping on) the physical object.

In some implementations, the representation of the physical object corresponds optical see-through or video pass-through data associated with the physical environment. In this example, the sensor readings may correspond to image data of the physical environment captured by an exterior-facing image sensor. In some implementations, the device captures image data (e.g., the sensor readings) of the physical environment and performs object and/or semantic segmentation techniques on the image data in order to classify the physical object. In this example, the representation of the physical object corresponds to a 3D model obtained from the virtual content library 461 based on the classification for the physical object.

In FIG. 5C, for example, the electronic device or a component thereof (e.g., the object the prompt/interrupt handler 446 in FIG. 4A) generates and displays the XR overlay 522 indicating a fill line for water according to the instruction (or a set of instructions) from the user speech input 506 in FIG. 5A (e.g., measure 16 fluid ounces in the pitcher). As another example, in FIG. 6E, the electronic device or a component thereof (e.g., the object the prompt/interrupt handler 446 in FIG. 4A) generates and displays the XR overlay 644 indicating a fill line for the appropriate amount of the chocolate chips 634 according to the recipe card 605 in FIG. 6A.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at an electronic device including one or more processors, a non-transitory memory, and a depth sensor:
        obtaining a task associated with a physical object within a physical environment;
        obtaining depth information, via the depth sensor, associated with the physical environment;
        determining one or more measurements for the physical object based at least in part on the depth information;
        generating a graphical overlay for the task based at least in part on the task associated with the physical object within the physical environment and the one or more measurements for the physical object;
        determining a location for the graphical overlay based at least in part on the task and the one or more measurements for the physical object; and
        causing presentation of the graphical overlay at the determined location relative to a representation of the physical object, wherein the representation is obtained using sensor readings of the physical object.

2. The method of claim 1, wherein obtaining the task includes performing text recognition on a physical or virtual object that includes a set of instructions.

3. The method of claim 1, wherein obtaining the task includes performing natural language processing on speech data associated with a set of instructions.

4. The method of claim 1, wherein the task corresponds to apportioning the physical object.

5. The method of claim 4, wherein the graphical overlay indicates a manner in which to apportion the physical object in order to achieve the task.

6. The method of claim 1, wherein the physical object corresponds to a vessel, and wherein the task corresponds to filling the physical object with another physical object.

7. The method of claim 6, wherein the graphical overlay indicates a manner in which to fill the physical object in order to achieve the task.

8. The method of claim 1, wherein the one or more measurements corresponds to at least one of a volume of the physical object, spatial dimensions of the physical object, a mass of the physical object, or a surface area of the physical object.

9. The method of claim 1, wherein the depth information corresponds to a mesh for at least the physical object.

10. The method of claim 1, wherein the depth information corresponds to a point cloud for at least the physical object.

11. A device comprising:
a depth sensor;
one or more processors;
a non-transitory memory; and
one or more programs stored in the non-transitory memory, which, when executed by the one or more processors, cause the device to:
 obtain a task associated with a physical object within a physical environment;
 obtain depth information, via the depth sensor, associated with the physical environment;
 determine one or more measurements for the physical object based at least in part on the depth information;
 generate a graphical overlay for the task based at least in part on the task associated with the physical object within the physical environment and the one or more measurements for the physical object;
 determine a location for the graphical overlay based at least in part on the task and the one or more measurements for the physical object; and
 cause presentation of the graphical overlay at the determined location relative to a representation of the physical object, wherein the representation is obtained using sensor readings of the physical object.

12. The device of claim 11, wherein obtaining the task includes performing text recognition on a physical or virtual object that includes a set of instructions.

13. The device of claim 11, wherein obtaining the task includes performing natural language processing on speech data associated with a set of instructions.

14. The device of claim 11, wherein the task corresponds to apportioning the physical object, and wherein the graphical overlay indicates a manner in which to apportion the physical object in order to achieve the task.

15. The device of claim 11, wherein the physical object corresponds to a vessel, wherein the task corresponds to filling the physical object with another physical object, and wherein the graphical overlay indicates a manner in which to fill the physical object in order to achieve the task.

16. The device of claim 11, wherein the one or more measurements corresponds to at least one of a volume of the physical object, spatial dimensions of the physical object, a mass of the physical object, or a surface area of the physical object.

17. A non-transitory memory storing one or more programs, which, when executed by one or more processors of a device with a depth sensor, cause the device to:
 obtain a task associated with a physical object within a physical environment;
 obtain depth information, via the depth sensor, associated with the physical environment;
 determine one or more measurements for the physical object based at least in part on the depth information;
 generate a graphical overlay for the task based at least in part on the task associated with the physical object within the physical environment and the one or more measurements for the physical object;
 determine a location for the graphical overlay based at least in part on the task and the one or more measurements for the physical object; and
 cause presentation of the graphical overlay at the determined location relative to a representation of the physical object, wherein the representation is obtained using sensor readings of the physical object.

18. The non-transitory memory of claim 17, wherein obtaining the task includes performing text recognition on a physical or virtual object that includes a set of instructions.

19. The non-transitory memory of claim 17, wherein obtaining the task includes performing natural language processing on speech data associated with a set of instructions.

20. The non-transitory memory of claim 17, wherein the task corresponds to apportioning the physical object, and wherein the graphical overlay indicates a manner in which to apportion the physical object in order to achieve the task.

21. The non-transitory memory of claim 17, wherein the physical object corresponds to a vessel, wherein the task corresponds to filling the physical object with another physical object, and wherein the graphical overlay indicates a manner in which to fill the physical object in order to achieve the task.

22. The non-transitory memory of claim 17, wherein the one or more measurements corresponds to at least one of a volume of the physical object, spatial dimensions of the physical object, a mass of the physical object, or a surface area of the physical object.

* * * * *